(12) United States Patent
Hasegawa et al.

(10) Patent No.: US 6,700,587 B1
(45) Date of Patent: Mar. 2, 2004

(54) PICTURE DISPLAY APPARATUS

(75) Inventors: Taketo Hasegawa, Yokohama (JP); Eisaku Tatsumi, Kawasaki (JP)

(73) Assignee: Canon Kabushiki Kaisha, Tokyo (JP)

( * ) Notice: Subject to any disclaimer, the term of this patent is extended or adjusted under 35 U.S.C. 154(b) by 0 days.

(21) Appl. No.: 09/141,349

(22) Filed: Aug. 27, 1998

(30) Foreign Application Priority Data

Aug. 28, 1997 (JP) ............................................. 9-232993
Aug. 28, 1997 (JP) ............................................. 9-232994

(51) Int. Cl.⁷ ................................................ G09G 5/02
(52) U.S. Cl. ..................................... 345/600; 358/1.18
(58) Field of Search ................................. 395/106, 109,
395/111–114, 103, 105, 117, 741, 739;
358/296, 527, 1.3, 1.5–1.6, 1.9, 1.12–1.15,
1.18, 442; 709/213, 217; 345/97, 326, 102,
520, 101, 603, 600, 690, 692, 698, 699,
802; 710/266, 268

(56) References Cited

U.S. PATENT DOCUMENTS

| | | | |
|---|---|---|---|
| 5,483,634 A | 1/1996 | Hasegawa | 395/162 |
| 5,617,116 A | 4/1997 | Edgar | 345/150 |
| 5,894,546 A * | 4/1999 | Yoshida | 395/117 |
| 5,906,657 A * | 5/1999 | Tognazzini | 709/248 |
| 5,960,162 A * | 9/1999 | Yamamoto | 345/600 |
| 5,977,942 A * | 11/1999 | Walker et al. | 345/97 |
| 5,982,990 A * | 11/1999 | Gondek | 395/109 |

FOREIGN PATENT DOCUMENTS

| | | |
|---|---|---|
| JP | 2-256777 | 10/1990 |
| JP | 4-38190 | 3/1992 |
| JP | 5-274405 | 10/1993 |
| JP | 6-28434 | 2/1994 |
| JP | 6-149223 | 5/1994 |
| JP | 9-37096 | 2/1997 |
| JP | 10-198326 | 7/1998 |
| WO | WO 96/27261 | 9/1996 |

* cited by examiner

Primary Examiner—Matthew Luu
(74) Attorney, Agent, or Firm—Fitzpatrick, Cella, Harper & Scinto

(57) ABSTRACT

A high-definition display apparatus, such as a picture display, having a resolution at a level similar to that of a printer is connected to a data processor, such as a personal computer, to constitute a picture display apparatus, thereby displaying a document under preparation at a resolution level identical to that of the printer. As a result, an operator can confirm the style and appearance of a document under preparation to be printed on a real-time basis on the display apparatus, without necessitating actual printing out of the document under preparation. As a result, the printing time and paper for check-printing can be omitted to simplify the document preparation.

22 Claims, 23 Drawing Sheets

COMMAND LIST

| SPECIES CODE | COMMAND NAME | MEANING |
|---|---|---|
| 00 | PAGE START | START OF PAGE DATA |
| 01 | RESOLUTION | RESOLUTION OF RASTER DATA |
| 02 | FORMAT | ONE PIXEL BIT LENGTH OF RASTER DATA |
| 03 | PAPER SIZE | DESIGNATING PAPER SIZE FOR PAGE DATA |
| 04 | MARGIN | DESIGNATING TOP, BOTTM LEFT AND RIGHT MARGINS FROM PAPER EDGES |
| 10 | RASTER DATA (Y) | DESIGNATING Y-DATA OF RASTER DATA |
| 11 | RASTER DATA (M) | DESIGNATING M-DATA OF RASTER DATA |
| 12 | RASTER DATA (C) | DESIGNATING C-DATA OF RASTER DATA |
| 13 | RASTER DATA (K) | DESIGNATING K-DATA OF RASTER DATA |
| 20 | RASTER SKIP | DESIGNATING NUMBER OF RASTERS WITH NO DATA |
| 99 | PAGE END | END OF PAGE DATA |

FIG. 5

FIG. 6A PAGE START
| SC | 00 |

FIG. 6B RESOLUTION
| SC | 01 | VERTICAL RESOLUTION | LATERAL RESOLUTION |

FIG. 6C FORMAT
| SC | 02 | BIT LENGTH |

FIG. 6D PAPER SIZE
| SC | 03 | HEIGHT | WIDTH |

FIG. 6E MARGIN
| SC | 04 | TOP MARGIN | BOTTOM MARGIN | LEFT MARGIN | RIGHT MARGIN |

FIG. 6F RASTER DATA (Y)
| SC | 10 | DATA LENGTH | Y-DATA |

FIG. 6G RASTER DATA (M)
| SC | 11 | DATA LENGTH | M-DATA |

FIG. 6H RASTER DATA (C)
| SC | 12 | DATA LENGTH | C-DATA |

FIG. 6I RASTER DATA (K)
| SC | 13 | DATA LENGTH | K-DATA |

FIG. 6J RASTER SKIP
| SC | 20 | NUMBER OF SKIPS |

FIG. 6K PAGE END
| SC | 99 |

| Address | MSB ... LSB | |
|---|---|---|
| 20800000H LED PORT | ERR1 ERR0 POWER | W W W |
| 20800002H PUSHSW | SW4 SW3 SW2 SW1 SW0 | R R R R R |
| 20800004H DIP SW | SW3 SW2 SW1 SW0 | R R R R |
| 20800010H CENTRODATA | D7 D6 D5 D4 D3 D2 D1 D0 | R R R R R R R R |
| 20800012H CENTROCONT | DREQ STROBE BUSY | R R R/W |
| 20800020H SERIALCONT | RTS CTS | R R/W |
| 20800030H LINE AB (FOR LINE A/B SWITCH) | Linc-B | R/W |
| 20800032H LINECONT | ENABLE BUSY ERR END OUT | R/W R R R R/W |

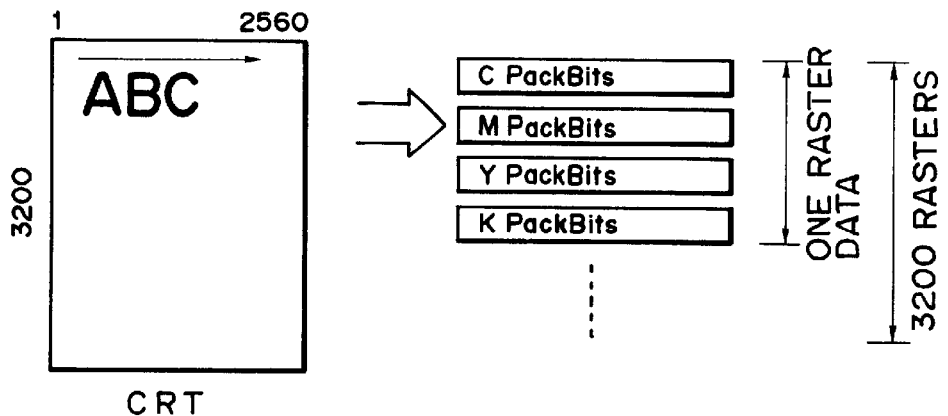
FIG. 20A
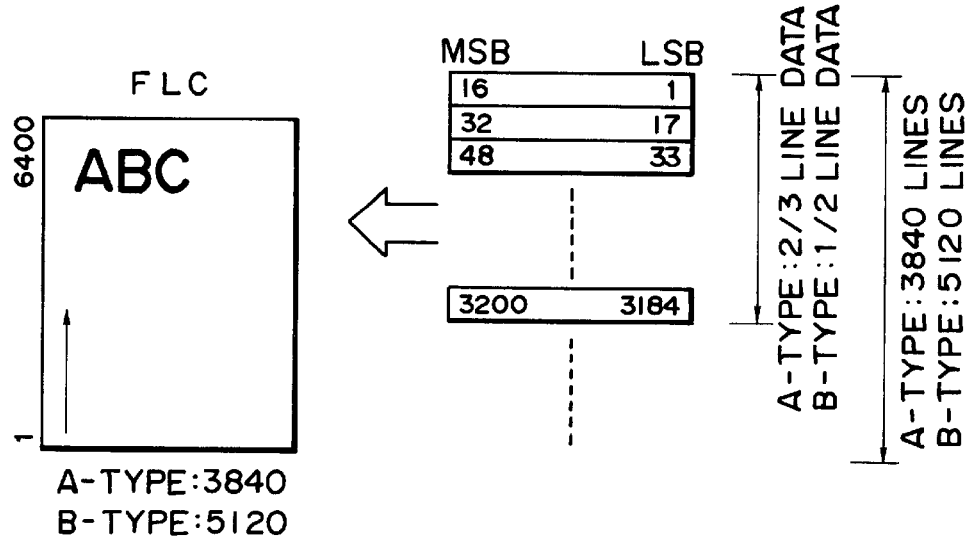
FIG. 20B
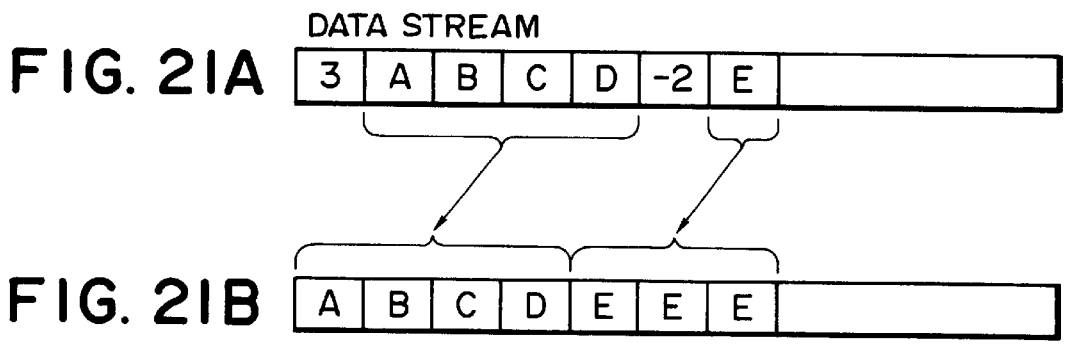
FIG. 21A
FIG. 21B

PICTURE DISPLAY APPARATUS

FIELD OF THE INVENTION AND RELATED ART

The present invention relates to an image or picture display apparatus used for preparation of a document and display of the prepared document, and more specifically to a picture display apparatus capable of displaying a picture substantially equal to a picture printed out therefrom.

Hitherto, a document preparation system including a data processing apparatus, such as a word processor or a personal computer, to which a printer is connected, has been used at offices or in the home.

In case of preparing documents by using such a system, it has been a general practice to prepare a document by a data processor while checking its form or style on its display, and print out the prepared documents by a printer.

However, such a conventional system has included a data processor display and a printer that exhibit remarkably different degrees of resolution. Accordingly, there results in a difference between a font on a display and a font printed out by a printer, so that a sentence displayed in one row on a display can be printed out in two rows in some cases. Further, in case where a photographic image is printed out as a document, some picture processing, such as enlargement or size reduction, is required accompanying the resolution difference. But in such a case, a deviation of several dots can occur depending on the image size and the ratio of enlargement/reduction, so that a photographic image displayed in one page on a display can be printed out in two pages in some cases.

In such a case where a displayed document and a corresponding printed-out document are deviated from each other, it becomes necessary to re-correct the document after printing out the document, thus encountering much difficulty in getting a desired document and wasting considerable amount of paper and time for printing out.

Some data processors have the capability of displaying an image to be printed out (hereinafter called a "printed-out image") before the actual printing-out thereof, but as the display resolution is inferior to the printer resolution, the printed-out image cannot be displayed in detail, so that the above difficulty has not been solved as yet.

On the other hand, as the resolution of a printer becomes higher, a higher-definition display apparatus is desired. A liquid crystal panel has been used as a high-definition display apparatus for a data processor, and compared with a conventional liquid crystal panel having a definition on the order of 1600×1200, a liquid crystal panel having a higher definition (e.g., 20000×2000 or higher) is desired.

It has been a general practice that a high-definition liquid crystal panel requires display ICs, and an OS or an application software for a data processor adapted for such a high-definition use. Even if display ICs adapted for a high-resolution display are used, there may be encountered a difficulty that small characters become difficult to read if general-purpose application software is used.

SUMMARY OF THE INVENTION

A principal object of the present invention is to provide a picture display apparatus capable of reducing troubles in preparing a document to be printed and minimizing waste paper or time during the document preparation.

Another object of the present invention is to provide a picture display apparatus for displaying a document to be printed, capable of allowing a high-definition picture display without using ICs specifically adapted for high-resolution display.

Another object of the present invention is to provide a picture display apparatus capable of obviating a lowering in display quality when multi-purpose application software is used.

According to the present invention, there is provided a picture display apparatus, comprising: a data input means for inputting document data, a printer adapted for connection with the data input means so as to print out a picture based on the document data, and a picture display means connected to the data input means for displaying a picture based on the document data. The picture display means is adapted for displaying a picture that is substantially identical in shape and resolution to the picture to be printed out by the printer.

According to another aspect of the present invention, there is provided a picture display apparatus, comprising: data output means for outputting picture data for hard copies, a picture display means for displaying a picture based on the picture data, and a data conversion means disposed between and connected to said data output means. The picture display means converts the picture data outputted from the data output means into data adapted for display by the picture display means.

These and other objects, features and advantages of the present invention will become more apparent upon consideration of the following description of the preferred embodiments of the present invention taken in conjunction with the accompanying drawings.

BRIEF DESCRIPTION OF THE DRAWINGS

FIG. 5 illustrates an organization of print data transmitted from a data processor 2 to a high-definition display apparatus 3.

FIGS. 6A–6K illustrate organization of respective commands in the print data.

FIGS. 15 and 16 illustrate respective registers.

FIGS. 20A and 20B illustrate structures of page data and line data.

FIGS. 21A and 21B illustrate a method of elongating raster data.

DESCRIPTION OF THE PREFERRED EMBODIMENTS

Now, a first embodiment of the present invention will be described.

Figure 1:
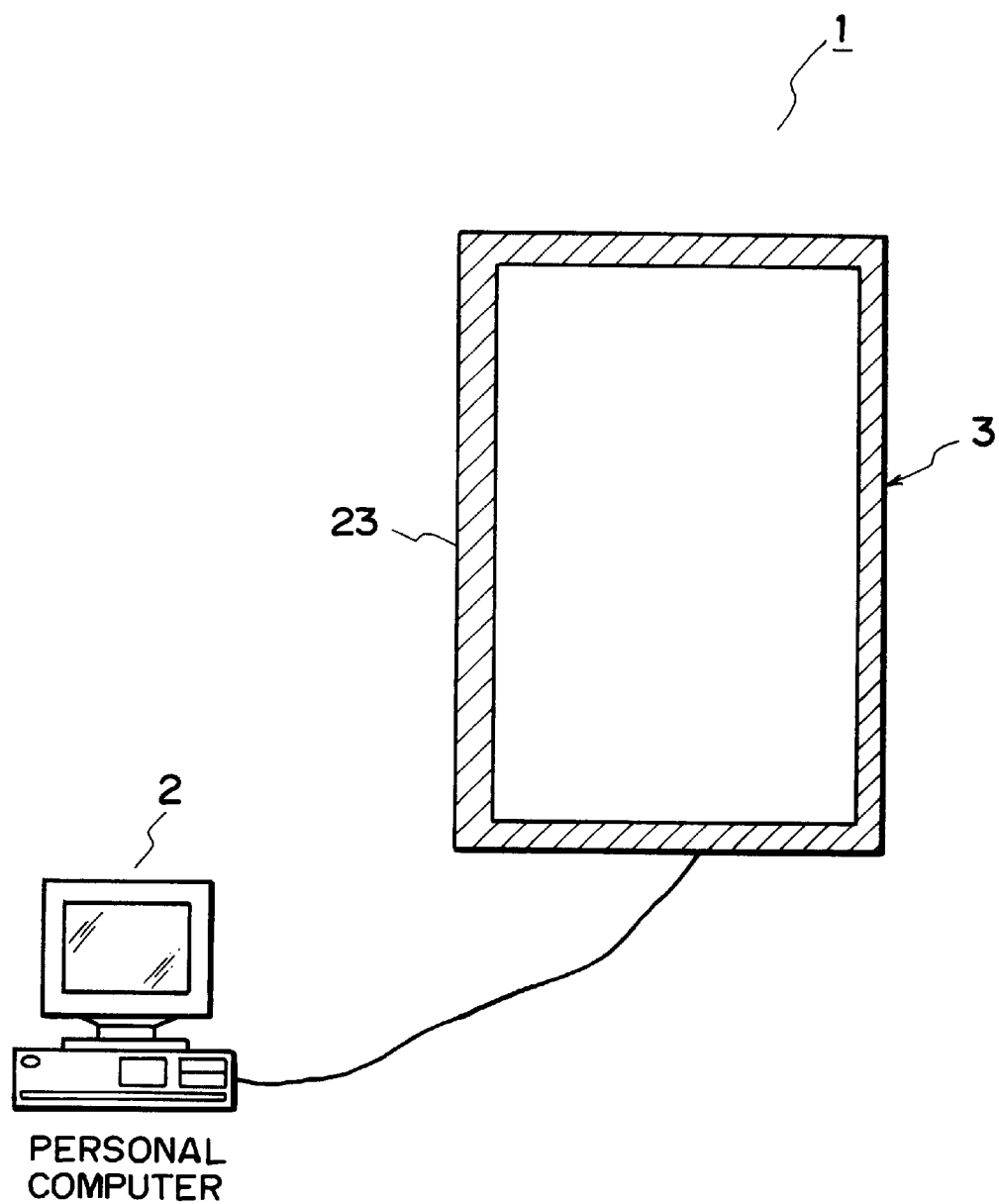
FIG. 1 is a schematic illustration of a high-definition display system according to a first embodiment of the invention.

As shown in FIG. 1, a picture display apparatus 1 according to this embodiment includes a data input means 2 to which document data is inputted. The data input means 2 is designed to be connected to a printer for printing out a picture or image based on the document data. The data input means 2 is further connected to a picture display means 3 for displaying a picture based on the display data. The displayed picture is almost equal to the picture to be printed and is designed to be displayed at a resolution almost equal to that of the printer.

The data input means 2 may for example comprise a personal computer or a word processor.

The above-mentioned document data includes at least luminance data. The data input means 2 includes a picture processing unit 10 as an input-side data conversion unit for converting the luminance data into density data, so that the density data will be transmitted from the data input means 2 to the picture display means 3.

The picture display means 3 includes an output-side data conversion unit 21 and a picture display unit 23, so that the density data is re-converted into luminance data by the output-side conversion unit 21 and a picture based on the luminance data is displayed on the picture display unit 23.

The data input means 2 may include an N-value-processing unit 11 for coding the density data into N-level values or into numbers according to a numeration system with a radix of N (N being a natural number of at least 2), e.g., binary (digit) values, so that the number of gradation levels displayed at the picture display unit 23 will be changed in the picture display means so as to correspond to the N-level coded values in the N-value processing unit 11.

The luminance data may comprise RGB-three-color luminance data, while the density data may comprise YMCK-four-color density data or YMC-three-color density data.

The picture display unit 23 may be designed to display a picture substantially identical to the one to be printed out and also display a form of paper for the print-out.

The picture display unit 23 may preferably comprise a high-definition liquid crystal device, which may preferably comprise, e.g., a simple matrix-type liquid crystal device using a liquid crystal showing ferroelectricity (hereinafter simply called "FLC").

The picture display apparatus according to this embodiment may be operated in the following manner.

When document data including luminance data is inputted to the data input means 2, the luminance data is converted into density data, and the converted density data is supplied to the picture display means 3, where the density data is re-converted into luminance data to display a picture substantially identical to a picture to be printed out.

According to this embodiment, the picture display means 3 displays a picture substantially identical to the one to be printed out, so that it is possible to prepare a document while observing the picture on the display means 3 and confirming the style and appearance thereof. Accordingly, a printing-out operation for confirming the appearance of the document becomes unnecessary, thus being able to obviate the waste paper and time for the printing-out.

This embodiment will be described more specifically.

As shown in FIG. 1, an (ultra-)high-definition display system (picture display apparatus) 1, includes a data processor (data input means) 2, such as a personal computer or a word processor, to which document data is inputted, and an (ultra-)high-definition display apparatus (picture display means) 3, so that a document can be prepared while confirming the style and appearance thereof on the high-definition display apparatus 3.

The data processor 2 is designed so that a printer is connected thereto as desired for printing out a picture based on the document data (i.e., the document).

Figure 2:
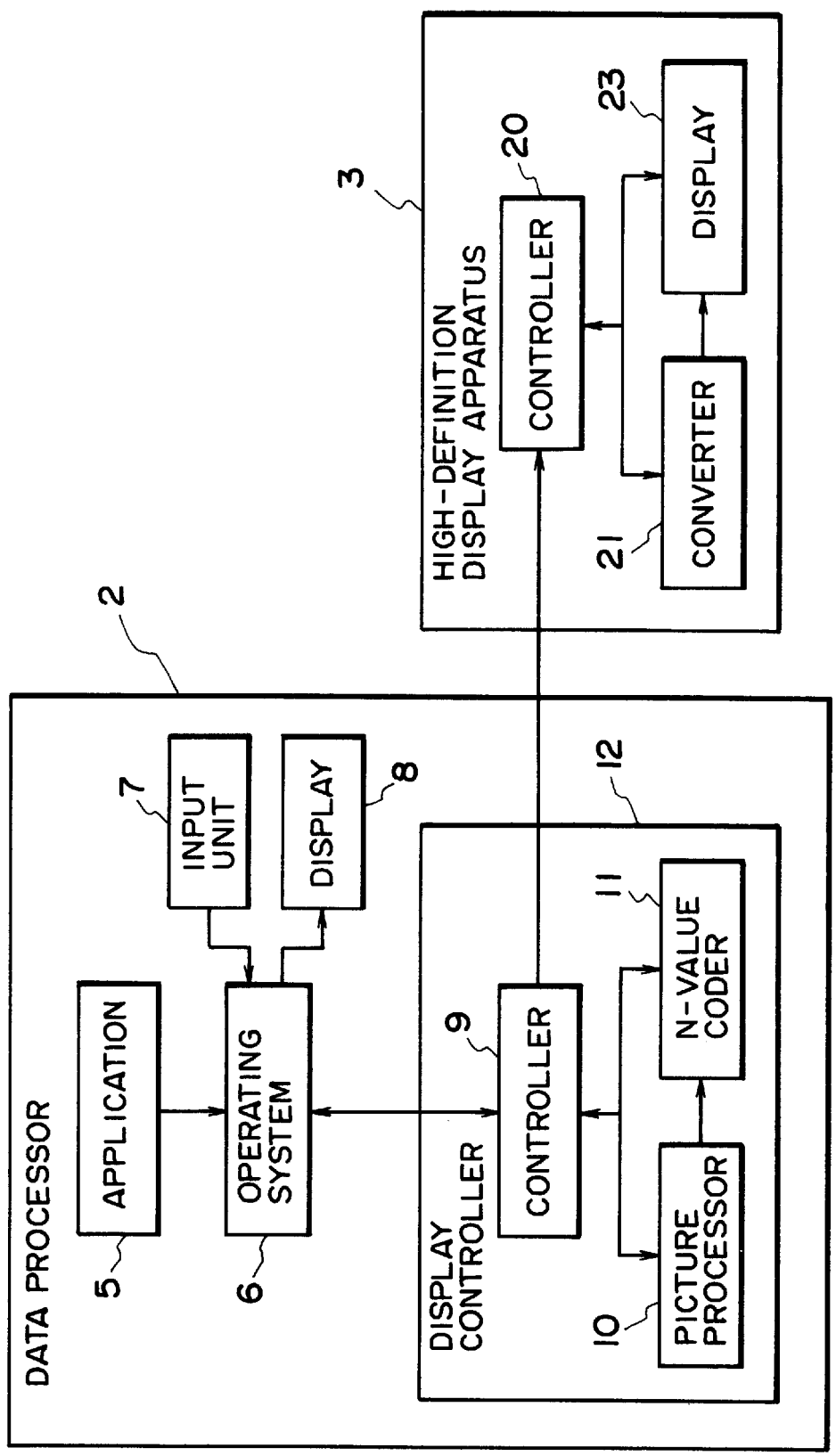
FIG. 2 is a block diagram for illustrating an entire organization of the high-definition display system.

FIG. 2 is a block diagram for illustrating an entire organization of the high-definition display system 1. As shown in FIG. 2, the data processor 2 is equipped with application software 5 for writing or word processing, an input unit 7 corresponding to a mouse device, a keyboard (or a means for receiving document data via a network) and a display unit 8, so that the application software 5, the input unit and the display unit are controlled by an operating system 6.

The data processor 2 is further equipped with a display control unit 12 for preparing data ("print data" which will be described in further detail hereinafter) to be supplied to the high-definition display apparatus 3, and the display control unit 12 includes a picture processing unit 10 for processing the document data to provide density data, an N-value processing unit 11 for coding the density data into N-level digit values, and a control unit 9 for controlling the units 10 and 11.

Figure 4A:
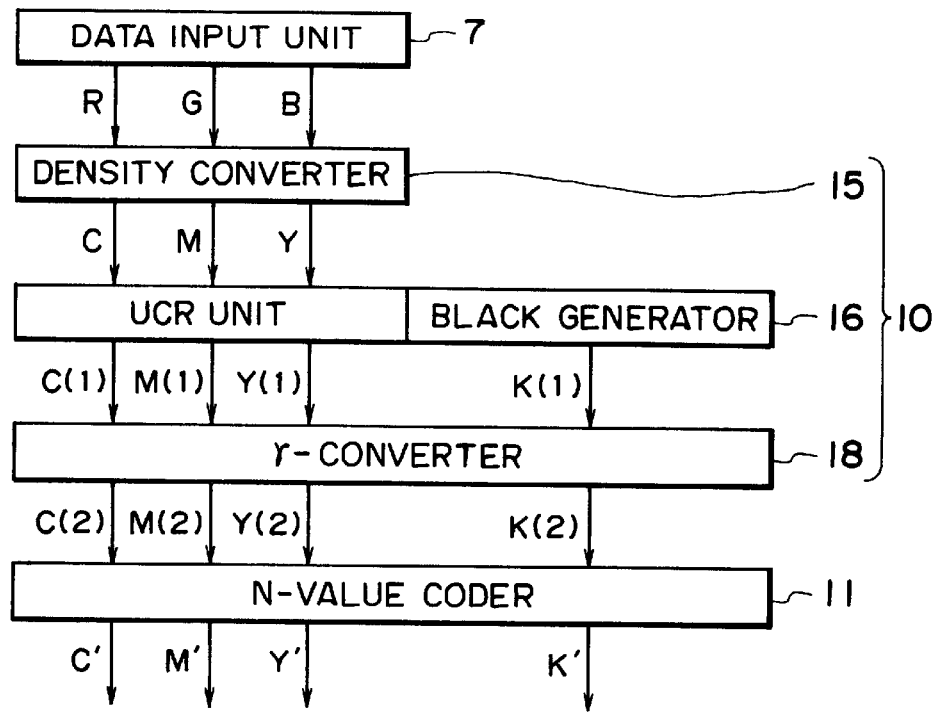
FIGS. 4A and 4B are an illustration and a flow chart, respectively, of a procedure for converting RGB luminance data to density data.

Further, as shown in FIG. 4A, the picture processing unit 10 includes a density conversion unit (input-side data conversion unit) 15 for converting RGB-luminance data (luminance signals according to the NTSC (National Television System Committee) system further converted into numerical values) into C, M and Y-density data, a UCR (Under Color Removal) unit 17 for removing a gray component from the density data C, M and Y, respectively, as an under color (or ground color), a black generation unit 16 for adding density data K corresponding to the gray component, and a γ-conversion unit 18 for effecting γ-conversion, (details being described hereinafter.).

Further, the high-definition display apparatus 3 integrally includes a control unit 20 for controlling the entirety of the apparatus, a conversion unit (output-side conversion unit) 21 for effecting various controls based on print data from the data processor 2 and a display unit (picture display unit) 23 for displaying print image. The display unit 23 may comprise, e.g., a simple matrix-type liquid crystal panel of high resolution (a display density of ca. 300 dpi) using FLC.

Further, a printer (not shown) for receiving and printing out the density data may be connected to the data processor 2 in parallel with or via the display apparatus 3. For the printer interface, it is possible to use Centronics I/F or RS232C Serial I/F.

Next, an operation for displaying a print image (which is a high-resolution picture) on the display unit 23 of the high-definition display apparatus 3 will be described with reference to FIGS. 3–8.

Figure 3:
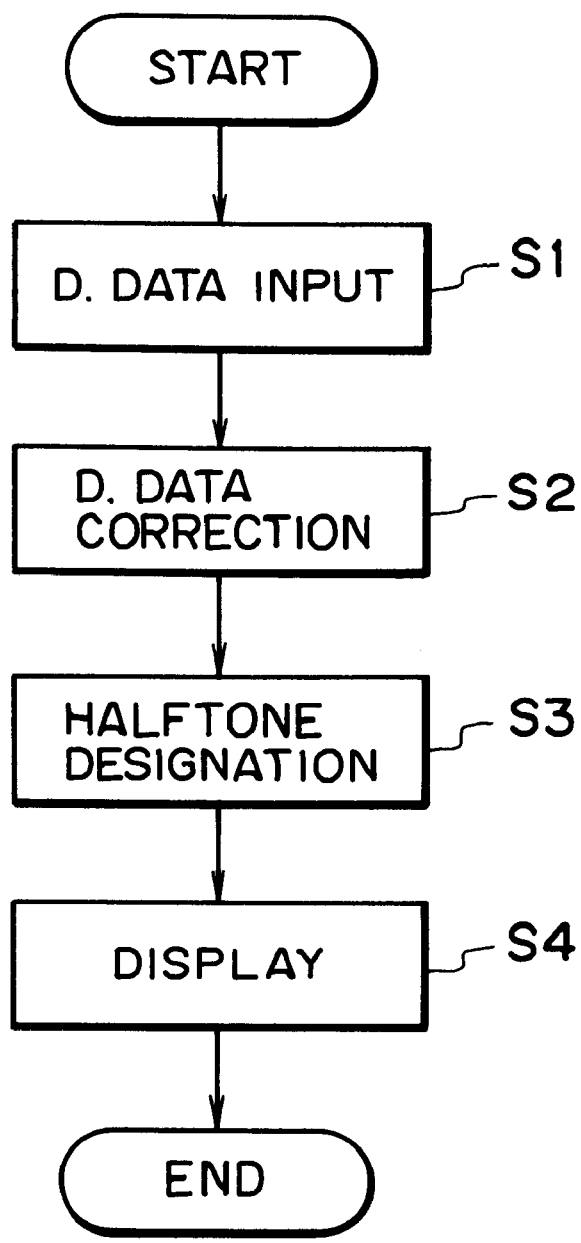
FIG. 3 is a flow chart for illustrating a function of the system.
Figure 4B:
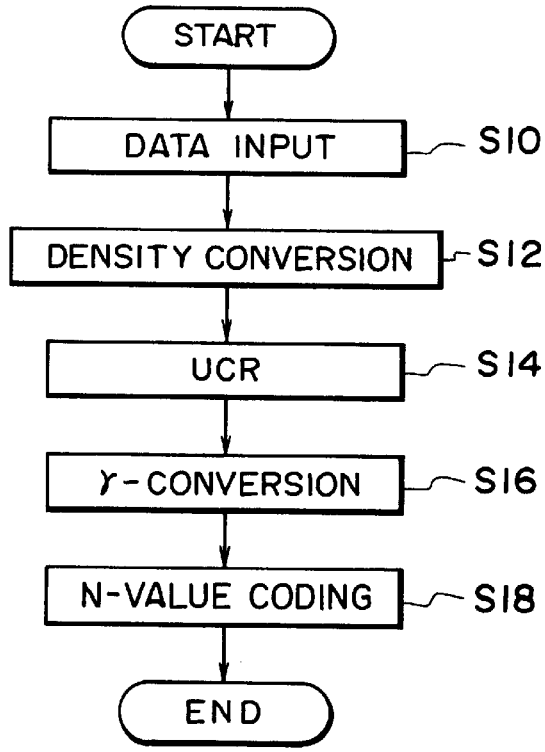
Figure 7:
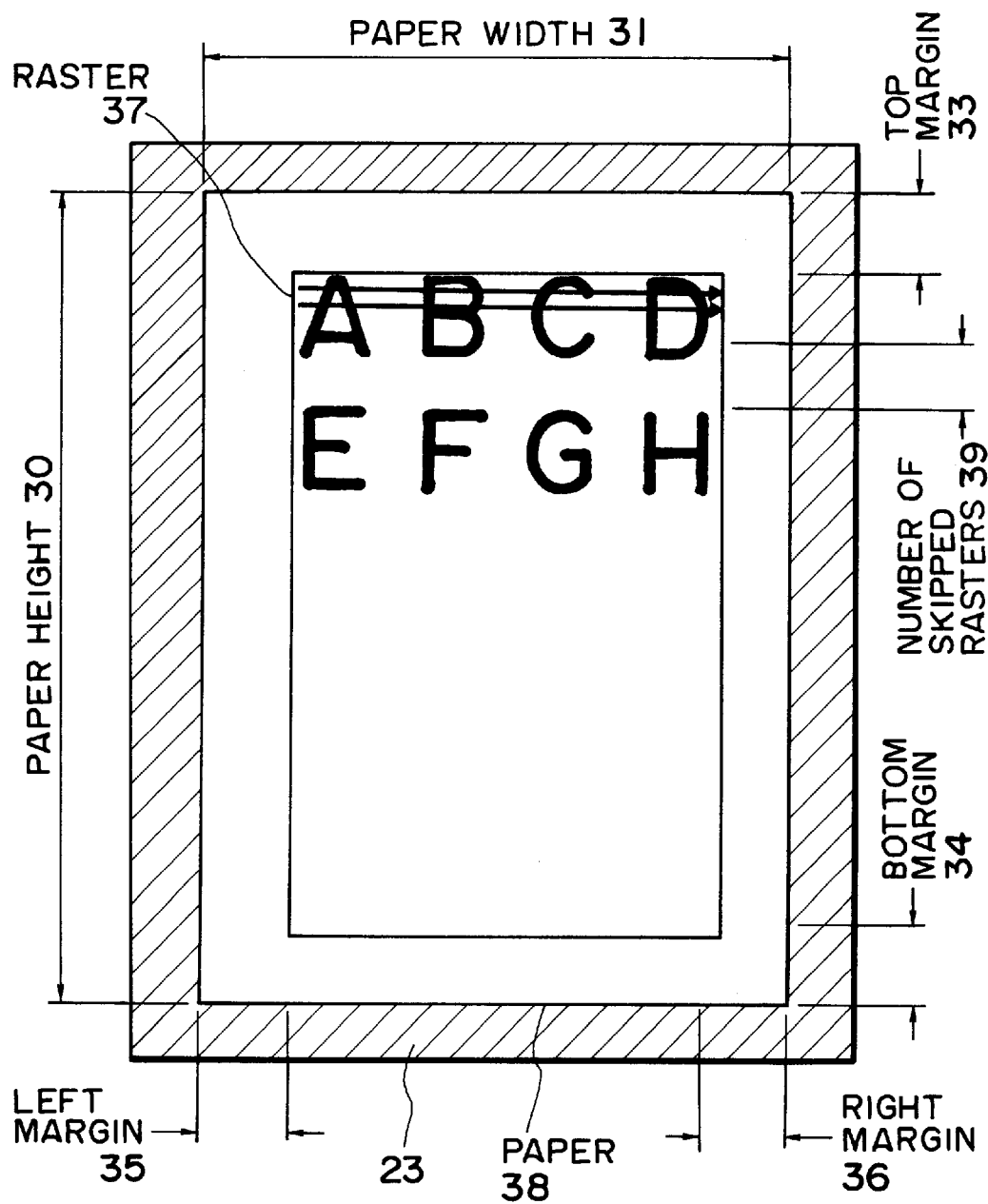
FIG. 7 is an illustration of a printed image together with denotation of respective commands in the print data.
Figure 8:
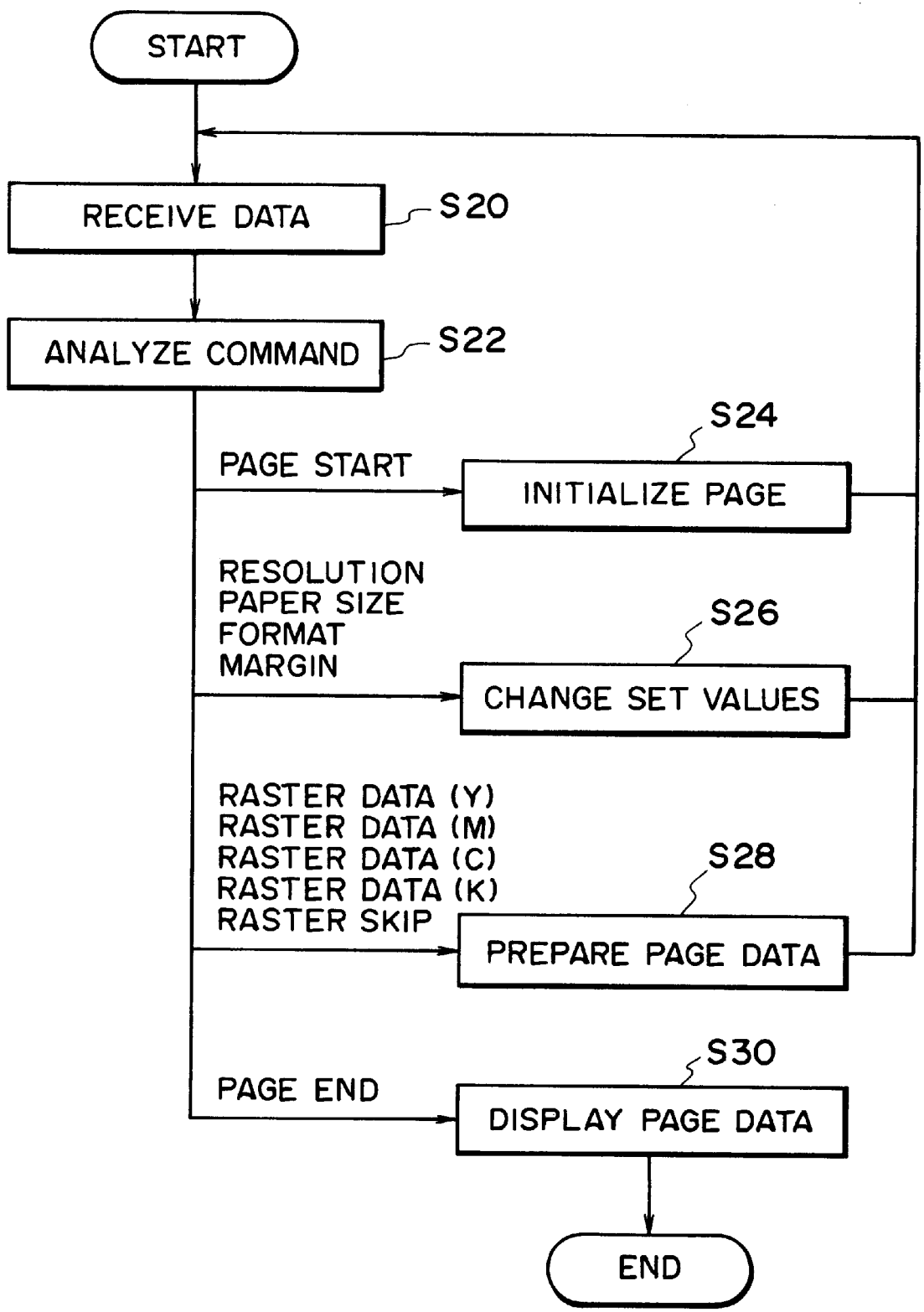
FIG. 8 is a flow chart for illustrating operation inside the high-definition display apparatus 3.

FIG. 3 is a flow chart for illustrating a function of the system. FIGS. 4A and 4B are an illustration and a flow chart, respectively, of a procedure for converting RGB luminance data to density data. FIG. 5 illustrates an organization of print data transmitted from a data processor 2 to a high-definition display apparatus 3. FIGS. 6A–6K illustrate organization of respective commands in the print data. FIG. 7 is an illustration of a printed image together with denotation of respective commands in the print data. FIG. 8 is a flow chart for illustrating operation inside the high-definition display apparatus 3.

[1] Operation of the Entire System

When a person for operating the system 1 (hereinafter called an "operator") inputs document data by using the input unit 7 of the data processor 2 (FIG. 3, S1), a print image (a picture or image substantially identical to a picture or image formed by printing) is displayed on the display unit 23 of the display apparatus 3 (FIG. 3, S4). At this time, the shape of paper for printing is also displayed (as will be later described in further detail).

After confirming the document appearance based on the print image on the display unit 23, the operator can correct the document data (FIG. 3, S2), if desired. If the document data is corrected, the corrected print image is displayed on the display unit 23 (FIG. 3, S4).

The system 1 is further designed to effect some control for adjusting the number of colors of print image to the number of colors of original data, such as a photographic image, so that the color of the print image is close to that of the original data (detail being described later), and also a halftone processing. In the system 1, the halftone processing method may be selected from various halftone processing methods, such as the error diffusion method and the pattern dither method, as desired by the operator, and depending on the selected method, a halftone-processed print image is displayed on the display unit 23 (FIG. 3, S4).

In the above-described steps, the input and/or halftone designation steps may be omitted or skipped, if these steps are unnecessary. On the other hand, other steps for designation of other items may be added, if necessary.

[2] Detail of Each Operation

[2-1] Operation of the Data Processor 2

When the operator inputs document data including RGB luminance data, the RGB luminance data is inputted to the picture processing unit 10 via the operating system 6 (FIGS. 4A and 4B, S10). Then, the RGB luminance data may be subjected to non-linear conversion, such as logarithm conversion, into density data C, M and Y (FIGS. 4A and 4B, S12).

Then, the CMY density data is subjected to the under color removal (UCR) and black generation by the UCR unit 17 and the black generation unit 16 according to the following formulae (FIGS. 4A an 4B, S14):

$$C(1)=C-\beta \times \text{MIN}(C, M, Y)$$

$$M(1)=M-\beta \times \text{MIN}(C, M, Y)$$

$$Y(1)=Y-\beta \times \text{MIN}(C, M, Y)$$

$$K(1)=\alpha \times \text{MIN}(C, M, Y),$$

wherein MIN (C, M, Y) denotes a minimum value among three density data C, M and Y; $\beta$ denotes a proportion of the under color removal with respect to MIN (C, M, Y); and $\alpha$ denotes a proportion of black generation.

Then, at the γ-conversion unit 18, the resultant density data C(1), M(1), Y(1) and K(1) are subjected to adjustment of output gamma (γ-conversion) into data C(2), M(2), Y(2) and K(2), respectively (FIGS. 4A and 4B, S16), so that the resultant signals of the data C(2), M(2), Y(2) and K(2) will satisfy a linear relationship with respective densities of a picture displayed on the display unit 23 corresponding thereto.

These data C(2), M(2), Y(2) and K(2) are multi-value data and are coded into N-level values by the N-value processing unit or N-value coder 11, thereby providing data C', M', Y' and K' (FIGS. 4A and 4B, S18).

As a result, print data is supplied to the high-definition display apparatus 3 via the controller.

As shown in FIG. 5, the print data is composed of respective commands of "PAGE START", "RESOLUTION", "FORMAT", "PAPER SIZE", "MARGIN", "RASTER DATA", "RASTER SKIP" and "PAGE END". The respective commands will now be described.

"PAGE START":

As shown in FIG. 6A, this command is composed of characters "SC" representing a start of command and a command species code of "00", thereby meaning a start of transfer of print data.

"RESOLUTION":

As shown in FIG. 6B, this command is composed of "SC", a command species code of "01", a vertical resolution and a lateral (or horizontal) resolution, thereby designating the resolutions in vertical and lateral directions of print image.

"FORMAT":

As shown in FIG. 6C, this command is composed of "SC", a command species code of "02", and a bit length (i.e., a value of N in N-level value coding, wherein N=2, 3, 4, . . . ).

"PAPER SIZE":

In the case of displaying a print image on the display unit 23, it is preferred to also display a paper shape with an image, and for this purpose, it is necessary to input data regarding the paper size into the high-definition display apparatus 3. This command is for designating the paper size (more specifically, a paper length or height (30 in FIG. 7) and a paper width (31 in FIG. 7) and is composed of "SC", a command species code of "03", a paper length, and a paper width.

The paper shape is displayed on the display unit 23 in a state of being centered with a central point of the display unit 23 as the center regardless of the paper size.

"MARGIN":

As shown in FIG. 6E, this command is composed of "SC", a command species code of "04", a top margin, a bottom margin, a left margin and a right margin and is used, as shown in FIG. 7, for designating a top margin 33 (a width of blank region for not being printed with characters, etc., along an upper edge of paper), a bottom margin (a width of blank region along a lower edge of paper), a left margin (a width of blank region along a left edge of paper) and a right margin (a width of blank region along a right edge of paper).

"LASTER DATA (Y)":

As shown in FIG. 6F, this command is composed of "SC", a command species code of "10", a data length and Y-data.

Herein, a "raster" refers to a row of dots along a lateral scanning at a portion of paper 38 except for the left margin 35 and the right margin 36.

In the system 1, density data is supplied from the data processor 2 to the high-definition display apparatus 3 as described above, and one raster is composed separately for each of Y, M, C and K components for time-sequential designation. This command is used for designating Y-component density data, etc., of an objective raster.

Incidentally, Y-data may have been subjected to data compaction, such as Pack Bits according to the TIEF format. In this case, the data length refers to a compacted data length.

"RASTER DATA (C)":

As shown in FIG. 6H, this command is composed of "SC", a command species code of "12", a data length and C-data and is used for designating C-component density data, etc., of an objective raster.

"RASTER DATA (K)":

As shown in FIG. 6I, this command is composed of "SC", a command species code of "13", a data length and K-data and is used for designating K-component density data, etc., of an objective raster.

"RASTER DATA (K)":

As shown in FIG. 6I, this command is composed of "SC", a command species code of "13", a data length and K-data and is used for designating K-component density data, etc., of an objective raster.

"RASTER SKIP":

For example, in case where there occurs a number of rasters requiring no writing as represented by a blank row spacing 39 between character rows as shown in FIG. 7, YMCK components do not occur for these rasters. In such a case, the above-mentioned raster data are not sent for these rasters, but only data concerning the number of such rasters is supplied, whereby the number of rasters are skipped on the high-definition display apparatus 3.

As shown in FIG. 6J, this command is composed of "SC", a command species code "20" and a skip number, thereby designating the number of rasters to be skipped.

"PAGE END":

As shown in FIG. 6K, this command is composed of "SC" and a command species code "99", thereby representing the end of print data transmission.

[2-2] Operation of the High-definition Display Apparatus 3

On receiving the print data (FIG. 8, S20), the high-definition display apparatus 3 analyzes what command is received thereby (FIG. 8, S22).

In case where the received command is "PAGE START", the page is initialized (FIG. 8, S24), default values are set to respective set value items.

More specifically, the item of resolution is set with the resolution of the high-definition display apparatus 3, the item of format is set with a number of bits that can be displayed by one pixel of the high-definition display apparatus 3, and the items of paper height and width are set with the values regarding the display region (i.e., number of sub-scanning lines and number dots along a main-scanning line, or numbers of scanning lines and data lines for defining the display region) of the high-definition display apparatus 3 while setting all the top, bottom, left and right margins at zero. Further, the RGB luminance data are respectively made the maximum to clear the set paper region.

If the received command is any of "PAPER SIZE", "RESOLUTION", "FORMAT" AND "MARGIN", the respective set values are changed from the default values to the designated values (FIG. 8, S26).

Now, if the designated value of resolution does not agree with the resolution of the high-definition display apparatus 3, a resolution conversion is effected by size enlargement/reduction.

If the bit length B0 designated by "FORMAT" does not agree with the bit length B1 per one pixel of the high-definition display apparatus 3, the bit length is adjusted by the conversion unit 21 in the following manner.

In case of $B0>B1$; $D1=D0>>(B0-B1)$.

In case of $B0<B1$; $D1=D0<<(B1-B0)$.

In the above, D1 denotes display data, D0 denotes input data (i.e., print data), and >> and << denote N bit shift for obtaining D1 by shortening and elongating, respectively, of the input data D0 by $|B0-B1|$ bit.

If the designated size is larger than the display region of the high-definition display apparatus 3, the display region per se is adopted as the paper size, and the set values of resolution, format and margin are changed.

If the received command is "RASTER DATA (Y)", "RASTER DATA (M)", "RASTER DATA (C)" or "RASTER DATA (K)", the conversion unit 21 converts the density data YMCK into RGB luminance data to prepare page data (FIG. 8, S28).

$R=\sim C$ $G=\sim M$ $B=\sim Y$ $R=G=B=\sim K,$ wherein "$\sim$" represents inverting from density data (C, M or Y) into complementary luminance data (R, G and B), and the last formula of $R=G=B=\sim K$ means that the inverted value of K is allotted to identical levels of complementary luminance of R, G and B.

If the received command is "RASTER SKIP", the designated skip number of rasters are skipped to prepare page data (FIG. 8, S28). The skip number may be adjusted depending on the resolution so that the print image is not affected by the resolution.

If the received command is "PAGE END", the page data is displayed on the display unit 23 (FIG. 8, S30).

Figure 9A:
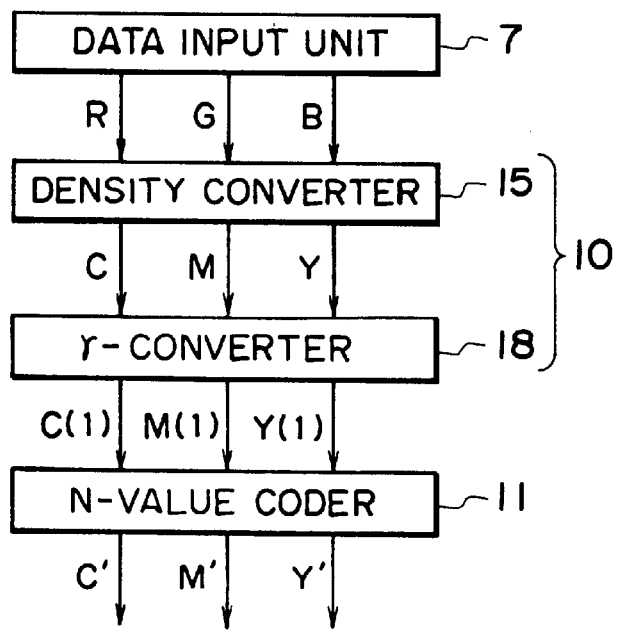
FIGS. 9A and 9B are an illustration and a flow chart, respectively, of a procedure for converting RGB luminance data to density data according to another embodiment.
Figure 9B:
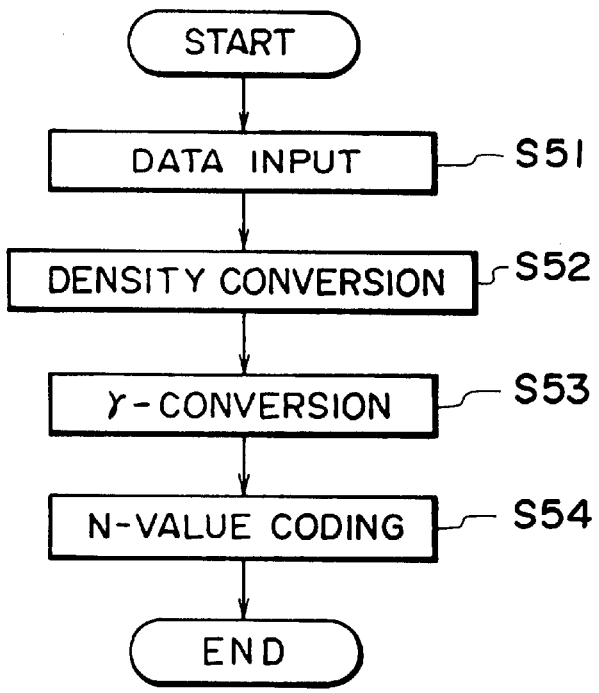
Figure 10:
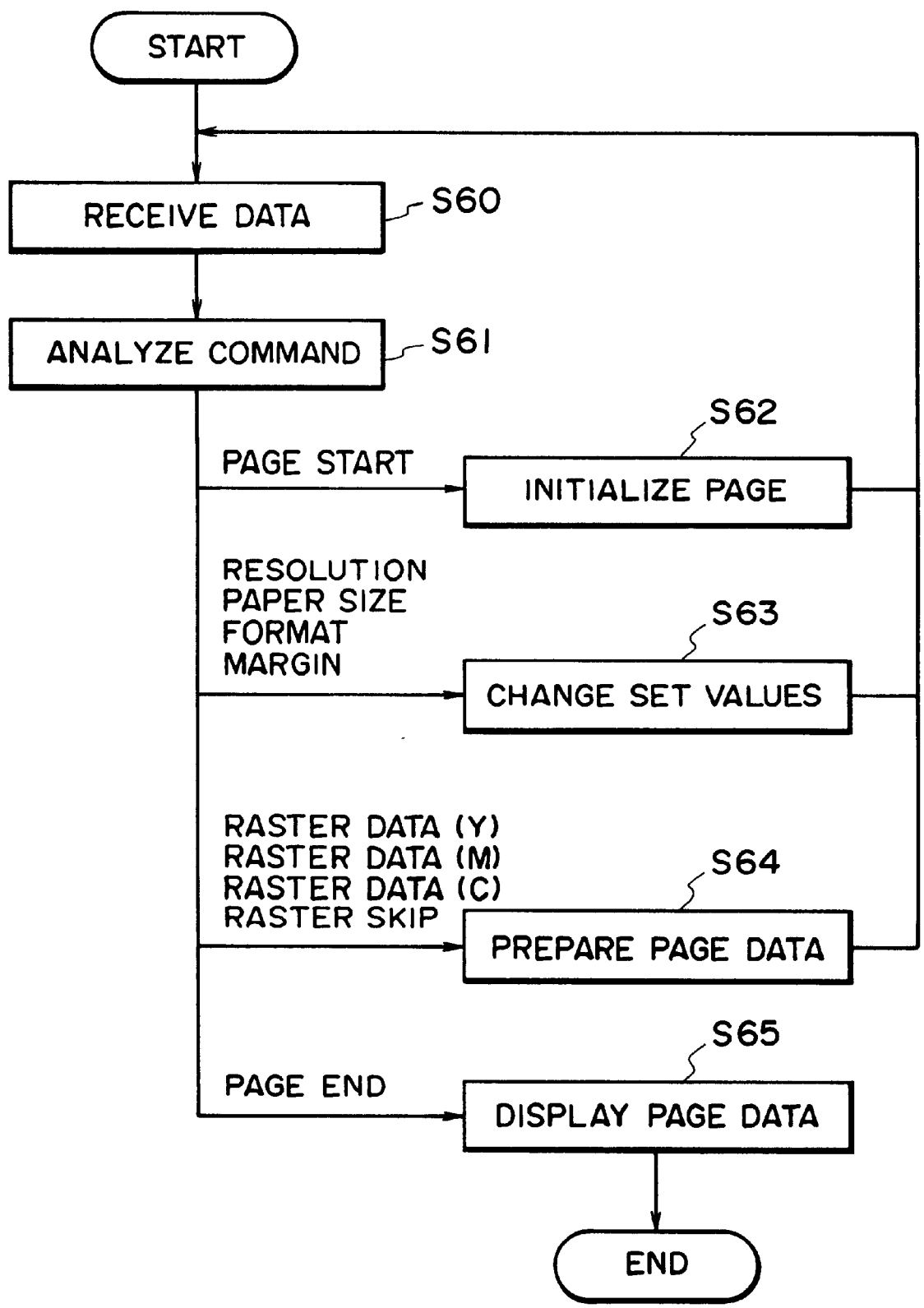
FIG. 10 is a flow chart for illustrating operation inside the high-definition display apparatus 3 according to another embodiment of the invention.

It is possible to modify the above embodiment so that the picture processing unit 10 is not provided with the UCR (under color-removal) unit 17 or the black generation unit 16 (FIG. 4A.) but is designed to convert RGB luminance data into density data of only three colors of YMC. FIGS. 9A and 9B illustrate this modification of luminance-density conversion in comparison with FIGS. 4A and 4B. Corresponding to this modification, the three-color density data is supplied from the data processor 2 to the high-definition display apparatus 3, wherein the density data is re-converted into RGB luminance data (FIG. 10).

Next, a second embodiment of the present invention will be described, wherein document data (print data) as picture data for printing out hard copies is prepared by a data processor, such as a personal computer, and a picture based on the picture data is displayed on a specific high-definition display apparatus by using a specific data page control means.

Figure 11:
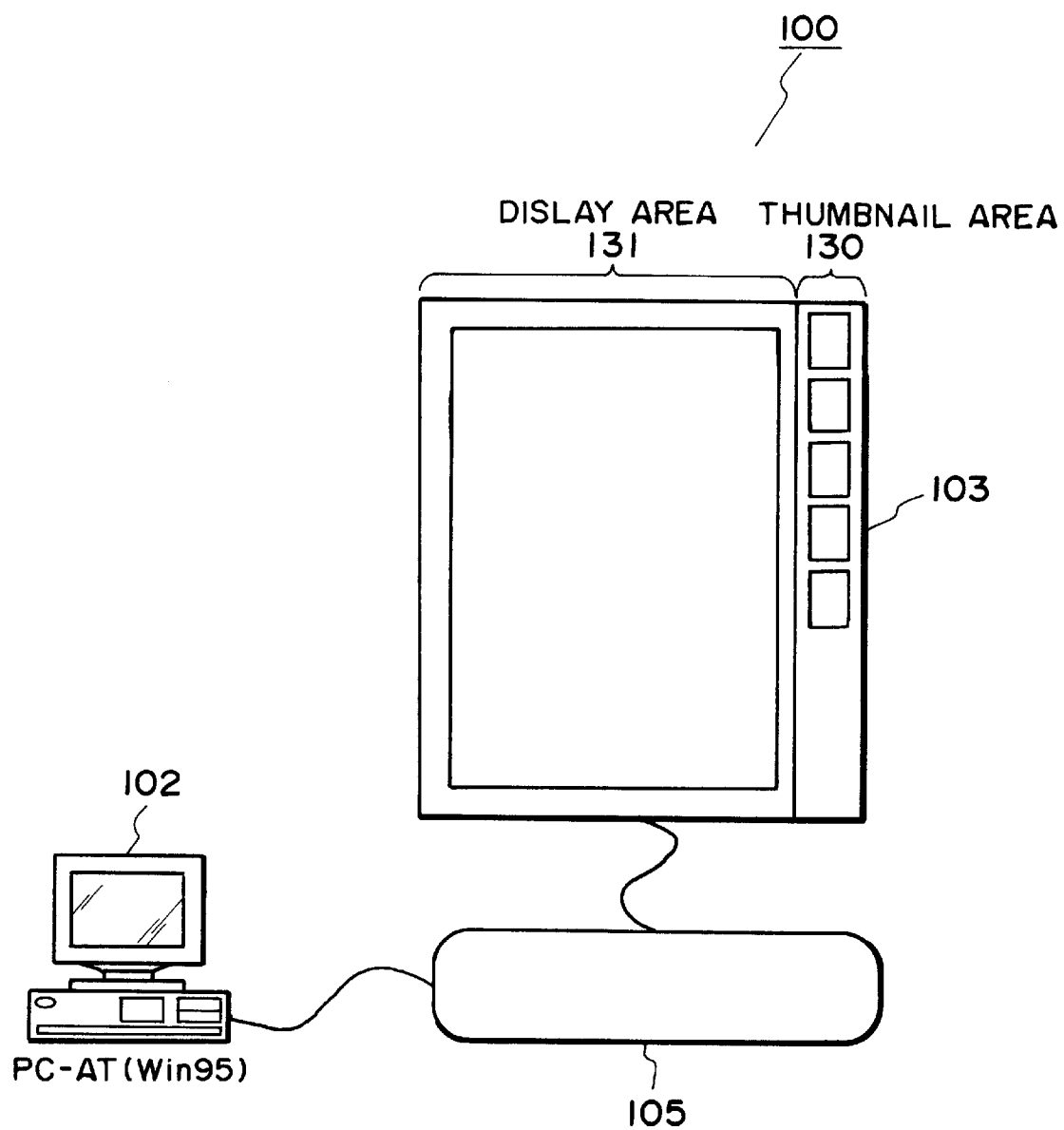
FIG. 11 is a schematic illustration of an entire organization of another embodiment of the picture display apparatus according to the invention.

Referring to FIG. 11, a picture display apparatus 100 according to this embodiment includes a data output means 102 for preparing and outputting picture data for hard copies, and a picture display means 103 for displaying the picture data, which are connected via a data conversion means (a page controller) 105 for converting the picture data for hard copies into data suitable for display on the picture display means 103. More specifically, by the data conversion means 105, the picture data for hard copies is rearranged into data suitable for display on the picture display means 103.

If desired, the data conversion means 105 may be disposed on the picture display means 103 and particularly integrally with a display unit in the picture display means 103.

In this embodiment, the picture data for hard copies may for example be composed of YMC color data, and the YMC color data may be converted into RGB color data (or luminance data) by the data conversion means 105.

The picture display means 103 may preferably be one having a resolution of 200 dpi or higher, e.g., a liquid crystal display panel.

According to this embodiments, document data for printing can be optimally displayed on a high-definition display means by function of the data conversion means and without using display driver ICs on the display side, or specific OS or application software on the data processor side.

Now, this embodiment will be described more specifically.

Referring to FIG. 11, a picture display apparatus 100 includes a personal computer (PC-AT) 102 (as a data processor or a data output means), and a display apparatus 103 (as a picture display means) including a liquid crystal display panel as a display unit.

The data output means (102) in this embodiment refers to a means for converting data inputted by an operator into picture data for hard copies as document data and outputting the picture data to the picture display means (103) and substantially corresponds to the data input means (2) in the previous embodiment.

Figure 12B:
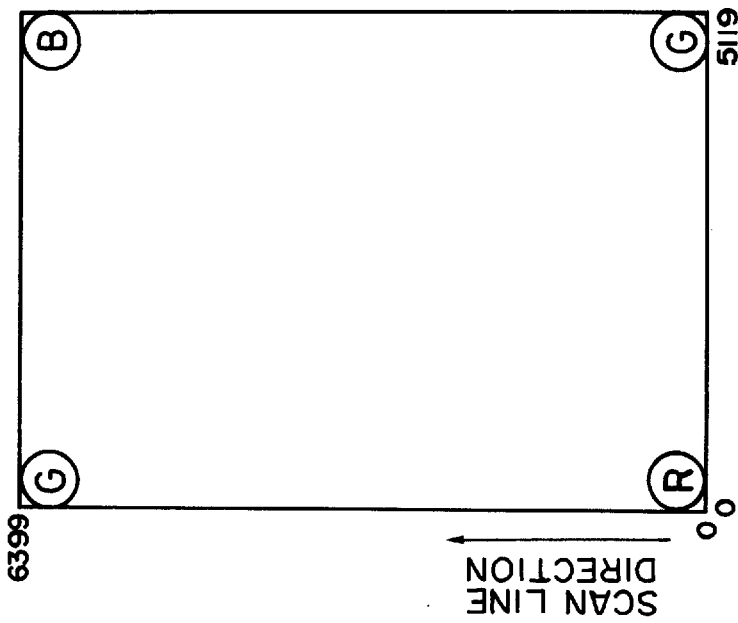
FIGS. 12A and 12B illustrate an A-type display apparatus.

The display apparatus 103 may for example comprise a liquid crystal display panel composed of FLC (ferroelectric liquid crystal) and a color filter having a resolution of ca. 300 dpi. The display apparatus 103 may be either one illustrated in FIG. 12 (hereinafter referred to as "A-type") or one illustrated in FIG. 13 (hereinafter referred to as "B-type"). In the apparatus 100, one of the A-type and B-type apparatus may be designed for use by a push button SW (described later).

Figure 12A:
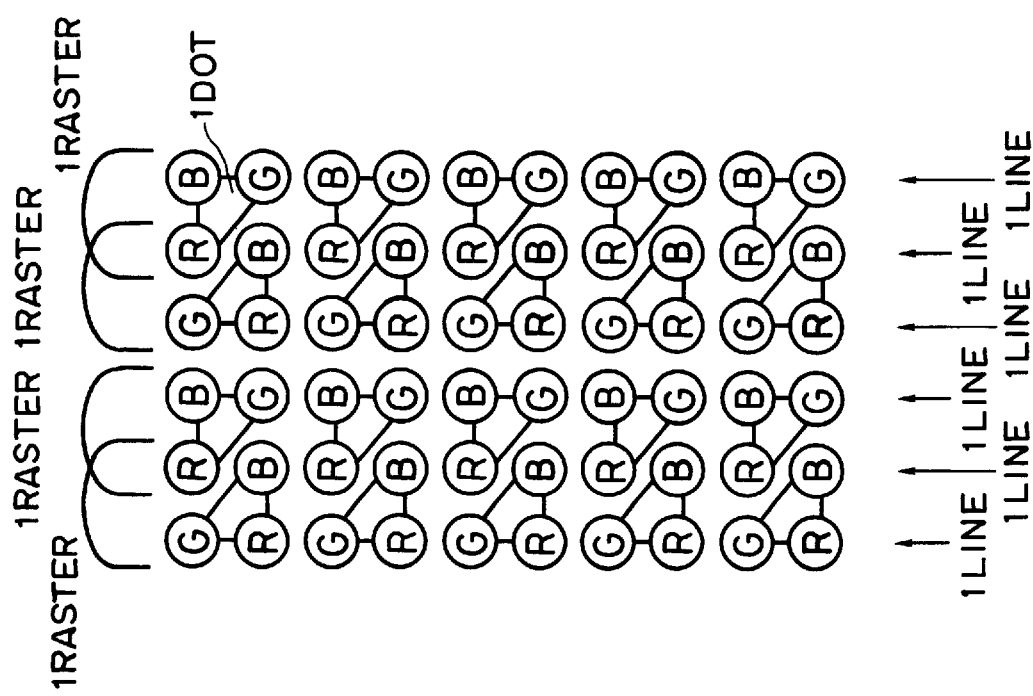
Figure 13B:
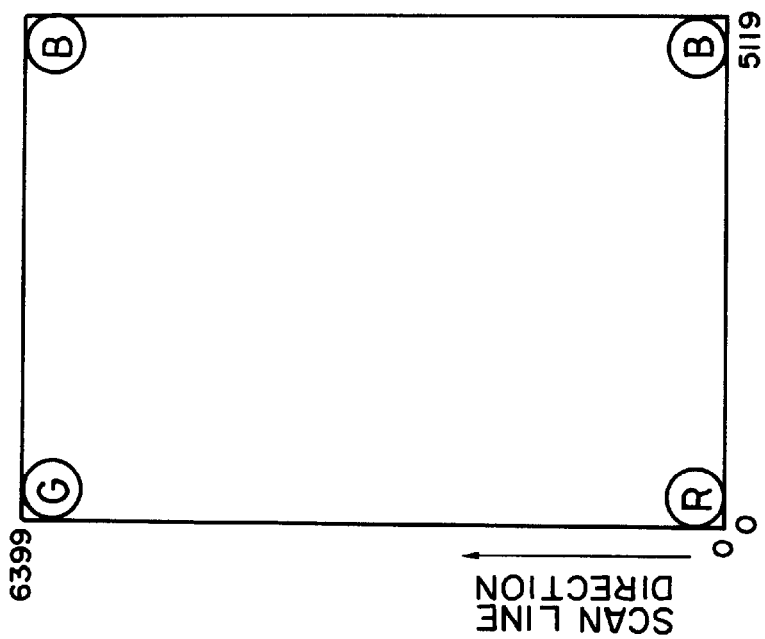
FIGS. 13A and 13B illustrate a B-type display apparatus.
Figure 13A:
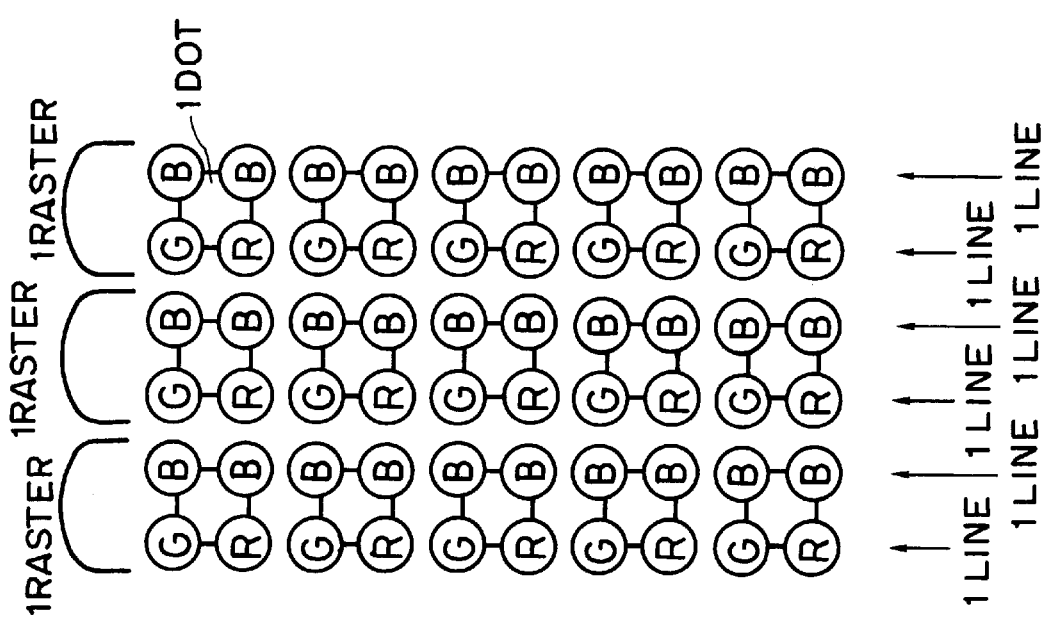

In the A-type display apparatus shown in FIG. 12A, 2 pixel rows are constituted by adjacent 3 scanning lines. More specifically, R and G color filter segments are alternately disposed along a first scanning line, B and R color filter segments are alternately disposed along a second scanning line, and G and B color filter segments are alternately disposed along a third scanning line, so that one pixel is composed of R and G segments along the first scanning line and a B segment along the second scanning line, and another one pixel is composed of an R segment along the second scanning line and G and B segments along the third scanning line.

On the other hand, in the B-type display apparatus, one pixel row is composed of adjacent 2 scanning lines. More specifically, R and G color filter segments are alternately disposed along a first scanning line, and B color filter segments are disposed in succession along a second scanning line, so that one pixel is composed of R and G segments along the first scanning line and two B segments along the second scanning line.

Figure 14:
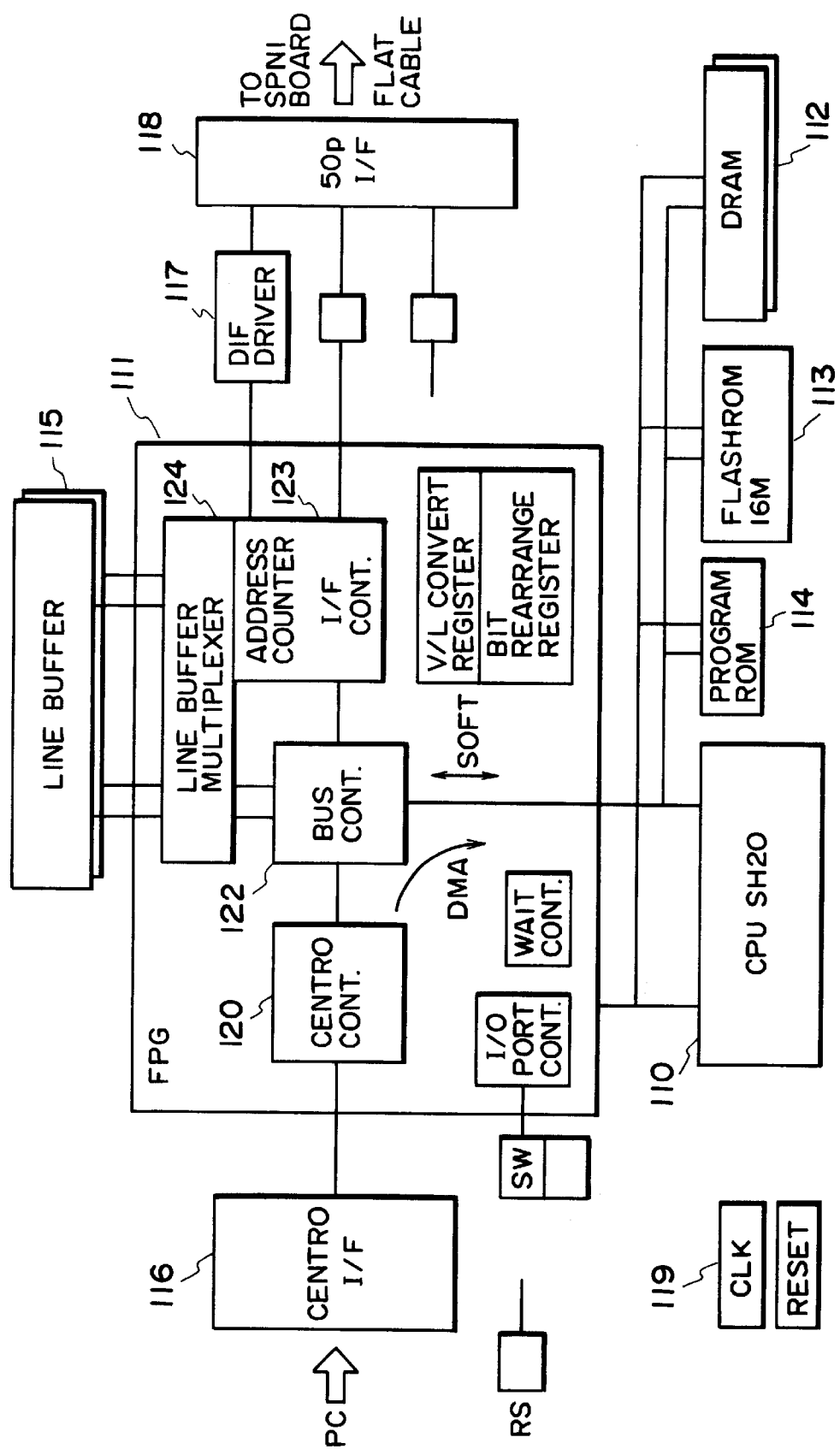
FIG. 14 is a block diagram for illustrating a structure of page controller.

On the other hand, as shown in FIG. 14, the page controller 105 includes a CPU 110, an FPG 111, an SDRAM 112, a flash ROM 113, a program ROM 114, a line buffer 115, a centronics interface 116 connected to a centrocontroller 120 of the FPGA 111, a display side interface (I/F) 118 connected to the FPGA 111 via a differential driver 117, etc., and a system clock 119. The page controller 105 has functions of, e.g., converting page data (picture data) read thereinto from the personal computer 102 into data for the display apparatus 113, memorizing data for 9 pages and causing the display apparatus 103 to disclose a picture based on one data among the 9 page data according to the instruction of the operator, and defining an area 130 of a prescribed width along a right edge of a display screen or display area (hereinafter called a "thumbnail area") and displaying pictures for the above-mentioned 9 pages (each at a ¹⁄₁₀ size) at the thumbnail area 130. The display/non-display or picture exchange at the thumbnail area can be designated by a push button SW (described later).

In a specific example, "SH2 (SH7604)" was used as the CPU 110, including a DRAM controller, DMA and RS232C (for indicating an operation state on the personal computer 102) as internal devices.

As the EPGA 111, "ALTERA 9560" (available from Altera Co.) was used.

DRAM 112 was used at 32 bit width and at CS2 region and CS3 region for storing 5 page data sent from Centronics interface 116.

The flash ROM 113 was composed of 8 flash ROMs of 2 MB and was used at 32 bit width and at CS1 region. The flash ROM 113 was used for storing frame data (for 4 pages) copied from the line buffer 115.

The line buffer 115 was composed of two SRAMs functioning as the line buffers for A-line and B-line which were switched therebetween by LINE AB register shown in FIG. 15 (as described later in detail). Each SRAM had a capacity of 2 KB (for expected capacity in use of 800 B+α) and was composed of 16 bit width.

The centronics interface 116 was connected to the personal computer 2 and designed to be adopted to timing of a single-direction centro and high-speed transfer mode.

The system clock 119 was operated at 20 MHz.

The program ROM was composed of 128 KB—EPROM and used at 16 bit width and CS0 region. In the program ROM 114, a control program was stored, and after checking the operation of DRAM 112 (after the initial setting operation), the program was sent to DRAM to be executed at DRAM 112.

The page controller 105 had 4 push buttons SW, which were used to designate a type of the display apparatus 103 (i.e., either one of A-type and B-type mentioned above), and designate whether a test pattern mode or not. The page controller 105 further had one reset switch (RESET).

The page controller 105 further included POWER LED turned on when a power switch was turned on, DATA IN LED turned on when STROBE signal was supplied via the centronics interface 116, and DATA OUT LED turned on when line data was outputted to the display apparatus 103.

Registers used in this embodiment will be described with reference to FIGS. 15 and 16.

LEDPORT is for ON/OFF of LED so that LED is ON at "1"; PUSHSW is for input to a push button SW; DIPSW is for input to a push button SW; CENTRODATA is for reading data from the centronics interface 116 and is also used for DMA; and CENTROCONT is for controlling the centronics interface 116 so that a sum of soft BUSY and hard BUSY is outputted to the outside. Further, SERIALCONT is for control of RS232C, whereas Txd, and Rxd utilize inner functions of CPU; LINE AB is for exchange between A and B lines so that "0" represents A-line is on the CPU side and B-line is on the output side. ATYPER, ATYPEG and ATYPEB are for data conversion inputs when the A-type display apparatus is used; ATYPE1, ATYPE2 and ATYPE 3 are for data conversion outputs when the A-type display apparatus is connected; BITFLIP is for exchanging LSB and MSB in bit row; TATEYOKO1, TATEYOKO2, TATEYOKO3 and TATEYOKO4 are for turning a picture by 90 deg. when page data is converted into line data. LINECONT is for line control, and the detail function thereof will be described later with reference to FIG. 22.

The operation of this embodiment will now be described.

The operation of the page controller 105 is described by outline at [1] and details of each operation is described at [2].

Figure 17:
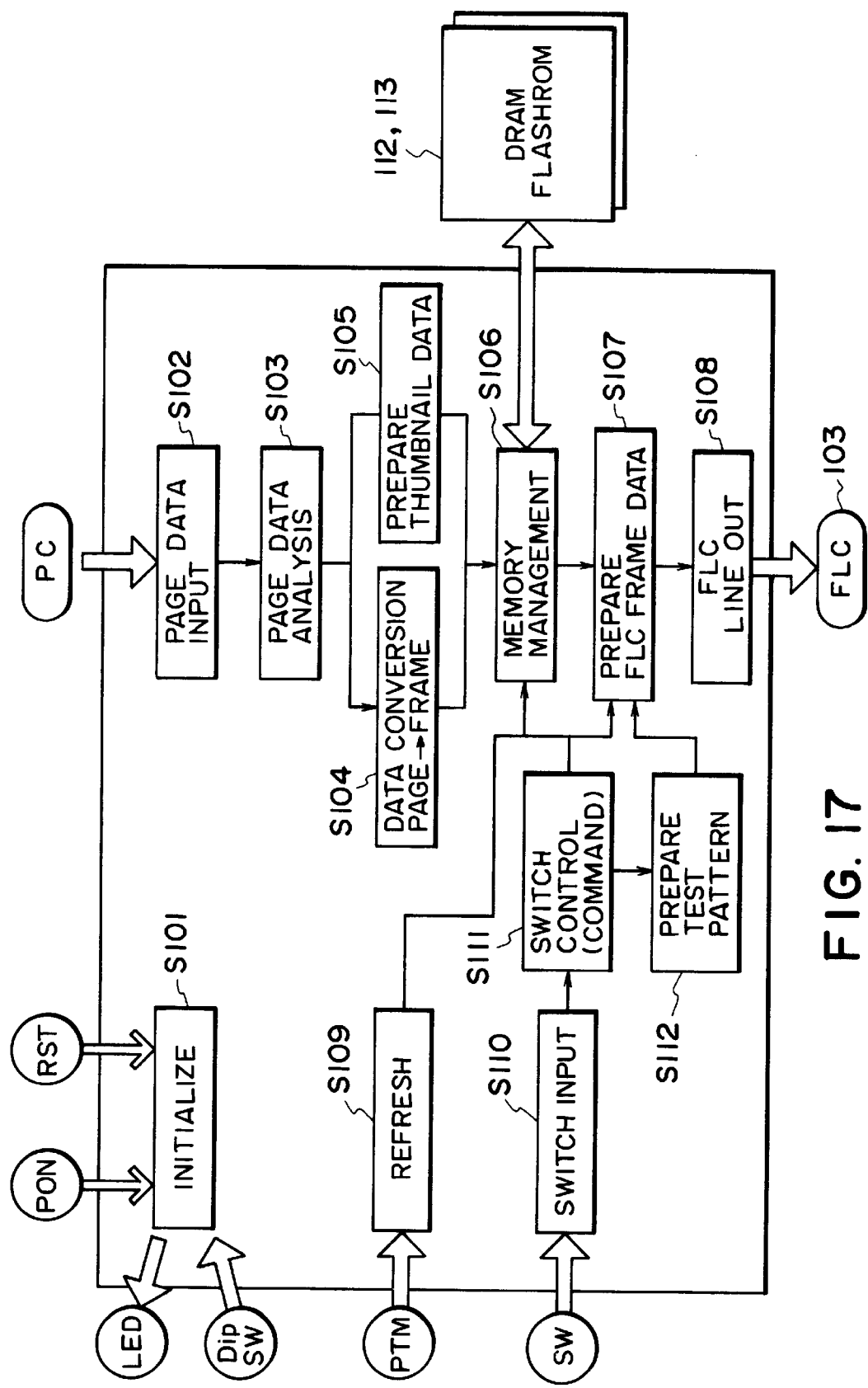
FIG. 17 is a flow chart for illustrating the operation of a page controller 5.

[1] Outline of the Operation of the Page Controller 105 (FIG. 17)

Referring to FIG. 17, when a power switch is turned ON (FIG. 17, PON) or a reset switch is turned ON (RST), an initialization sequence is effected (S101), including turning-ON of POWERLED (LED), memory checking, and reading of dip switch set values (Dip SW).

On the other hand, when page data is inputted from the personal computer 102 via the interface 116 (S102), the page controller 105 analyzes the page data (S103) and effects data conversion to prepare frame data and thumbnail data (S104, S105). The prepared frame data is transferred to the DRAM 112 where data for 5 pages is stored, and data for 4 pages is transferred to the flash ROM 113 to be stored at the flash ROM 113 (S106). Further, to the frame data, thumbnail data, cursor data (i.e., data for displaying a cursor on the screen), etc., are added, to prepare line data (S107). Thereafter, the line data is sequentially outputted to the display apparatus 103 (S108).

Incidentally, if a timer (PTM) counts a prescribed time, a refresh operation is performed (S109), a frame data identical to the one displayed immediately therebefore is prepared again (S107), a line data corresponding thereto is outputted (S108).

Further, if a switch input is present by a switch (SW) operation (S110), a command corresponding to the operated switch is generated (S111), and data corresponding to the operated switch is generated (S111), and data corresponding to the command is prepared (S107). For example, if a test pattern mode is instructed by the switch operation (S110, S111), a test pattern is prepared (S112, S107), and displayed on the display apparatus 103.

[2] Detail of Each Operation (FIGS. 21–24)

[2-1] Data Reading

In data reading, transfer is performed by utilizing DMA (direct memory access) function of CPU 110. In some cases, data for plural pages is read, so that DMA is performed while maximizing the receiving buffer size, and if data to be transferred is left without completing DMA, the conversion of page data is performed to empty the receiving buffer and then subsequent DMA is performed. In this instance, the CPU 110 is placed in a waiting state during the conversion of page data.

Figure 18:
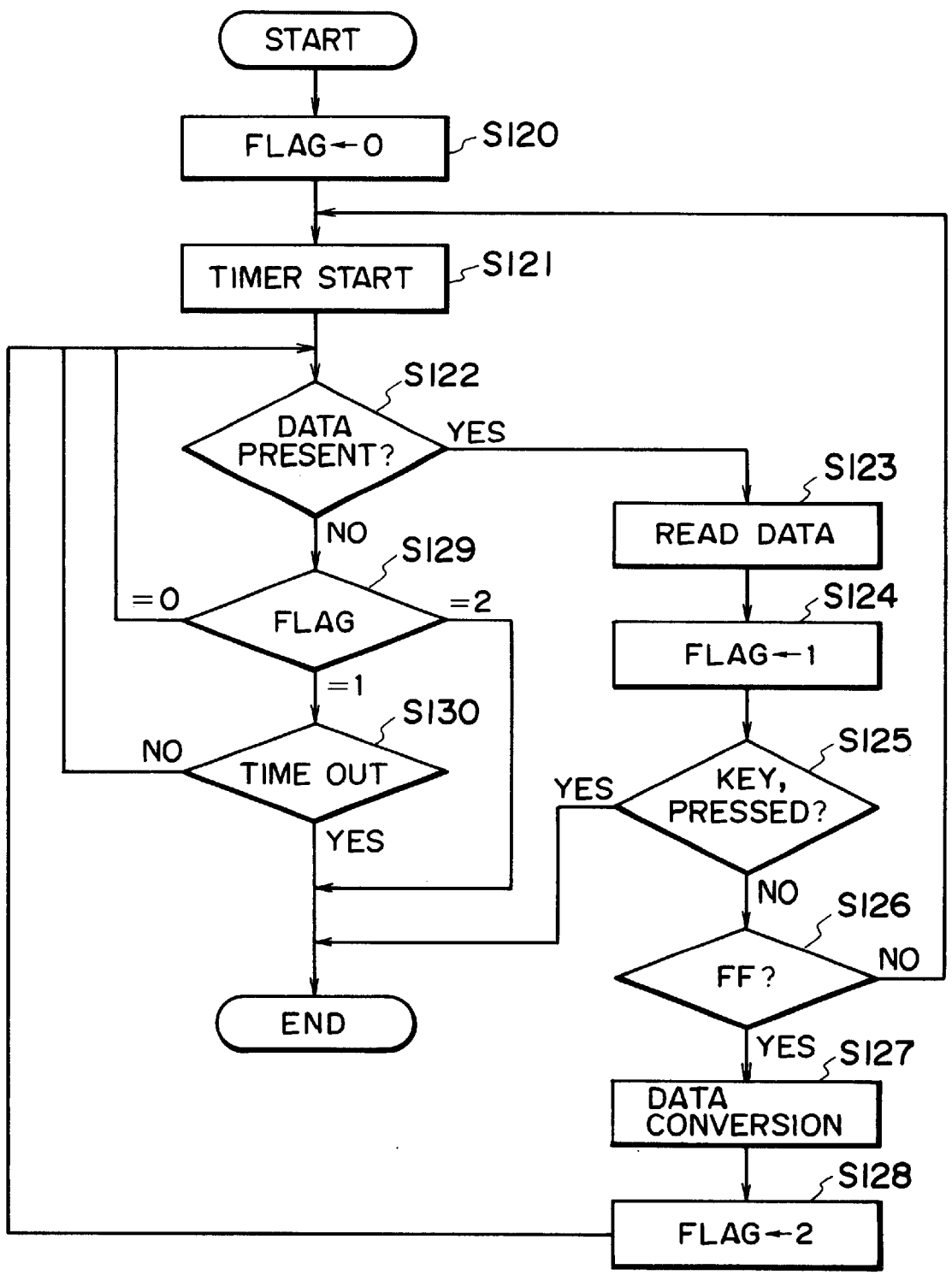
FIGS. 18 and 19 are respectively a flow chart for illustrating data read operation.

In data reading, first, a flag is initialized (FIG. 18, S120) to set a timer at, e.g., 30 sec. Then, input of page data is awaited (S112, S129), and if page data is inputted, the data is read (S112, S123) to make the flag "1" (S124).

In case where a key is pushed during the input of such page data, the processing is interrupted and the inputted page data is discarded (S125).

When no key is pressed during the page data input and if the read data is not for the final page (i.e., if the page end command FF is not detected), the time is again set to wait for data input (S126, S121, S129 and S130), and data is read (S123) if data is inputted during the set time, or this processing is terminated in case of no data input during the set time.

On the other hand, if the read data is for the final page (i.e., if the page end command FF is detected), the already inputted one page data is converted into line data (S127, detail being described later), and the flag is made "2" (S128).

In case where page data for the next page is inputted (S122) before the flag is made 2 (i.e., during the conversion into line data), the page data reading, etc., is performed similarly as above (S122, S123), but if no page data is inputted, the processing is terminated (S122, S129).

Figure 19:
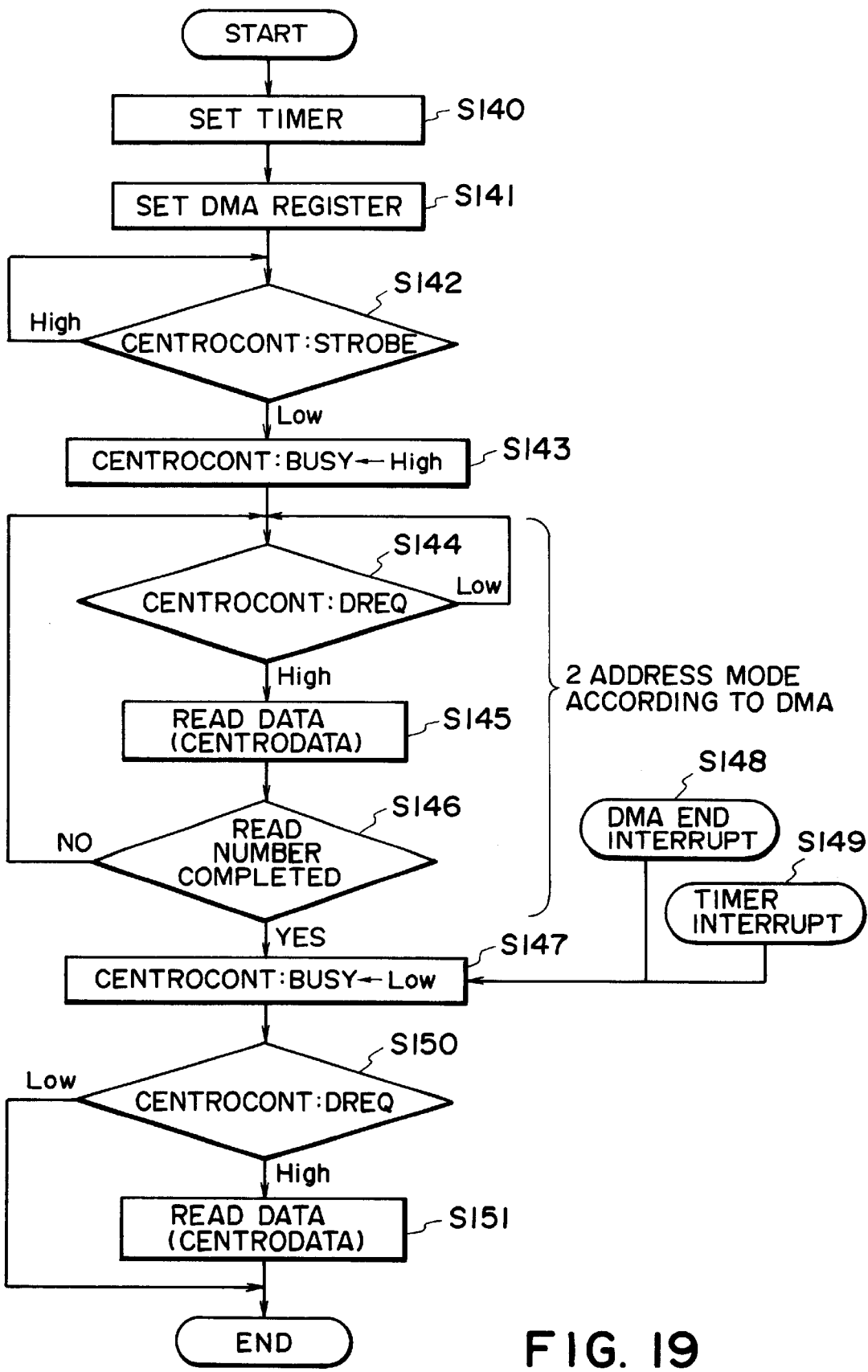

Detail of the above-mentioned data reading (FIG. 8, S123) will now be described with reference to FIG. 19.

For data reading, the time is set to, e.g., 1 sec. (FIG. 19, S140), an address register, etc., in DMA register in CPU 110 are set (S141), a STROBE signal is sent to the centronix interface 116 to wait until STROBE flag in CENTROCONT becomes Low (S142). When STROBE flag becomes Low, BUSY flag in CENTROCONT is made High (S143) whereby STROBE is made High to start data transfer, so that the data is latched and BUSY flag is made low. Then, DREQ flag in CENTROCONT is made High (S144), and data is read into DMA controller (S145). The data reading is repeated until the number of reading times set in DMA is reached (S146), and if the data reading is completed, BUSY flag is made Low (S147). At this time, if DREQ in CENTROCONT is High, one data is still present and is therefore read, and then the processing is terminated (S151).

Incidentally, in case where the number of read data is fewer than the number of reading times set in DMA, a timer interruption is caused (S149), BUSY flag is made Low even if the data reading is not completed, and the processing is terminated (S147). At this time, if DREQ in CENTROCONT is High, one data is still present and is therefore read, and then the processing is terminated (S151).

[2-2] Data Conversion (FIG. 17, S104)

[2-2-1] Structure of Page Data Before Conversion, and Structure of Time Data After the Conversion As described above, page data is inputted from the personal computer 102 via the Centronics interface 116. The page data is composed of raster data for hand copies comprising YMCK-color data, and various command data for indicating position of raster data, etc. As for raster data among these, as shown in FIG. 20A, color data for 4 colors of YMCK are arranged respectively laterally, a set of 4 color data constitutes one raster data, and the raster data is arranged vertically in 3200 row for 3200 rasters. The leading raster data is data regarding an uppermost line on a display, such as a CRT screen, and includes data from its left end to right end in that order.

On the other hand, the line data is composed of three colors of RGB. The data are arranged vertically and the lines are arranged laterally. The direction of data arrangement is from the bottom to the top.

[2-2-2] Operation of Data Conversion

Page data is converted into line data according to the following manner. Thumbnail data is prepared through a similar conversion, but page data is reduced to $\frac{1}{10}$ in advance of the conversion.

(1) Data Elongation

Raster data is in a compacted state, e.g., as shown in FIG. 21A so that it is elongated.

More specifically, if a leading first byte data N is in the range of $0 \leq N \leq 127$, N+1 data from those of the second byte to N+1-th byte are made raster data as they are so that the second byte data constitutes the leading data. FIG. 21A shows a case of N=2 satisfying $0 \leq N \leq 127$, so that 4 (sets of data) including those of 2nd byte to 5th byte (A, B, C, D) are made raster data as they are (FIG. 21B). In contrast thereto, if a leading data N is in the range of $-127 \leq N \leq -1$, a subsequent data is copied for −N+1 bytes to provide raster data, so that the second byte data is made the leading data. FIG. 21A shows a case of N=−2 (satisfying −127≦N≦−1), so that the subsequent data "Z" is copied for −(−2)+1=3 bytes to provide raster data of "E, E, E" (FIG. 21B).

(2) Conversion of YMCK Color Data into RGB Color Data

The data conversion is performed by ignoring K data and making complements of Y data, M data and C data to provide B data, G data and R data, respectively.

(3) 90 deg. Conversion

Data direction and line direction are mutually converted by using TATEYOKO register.

(4) Data Rearrangement

Figure 16:
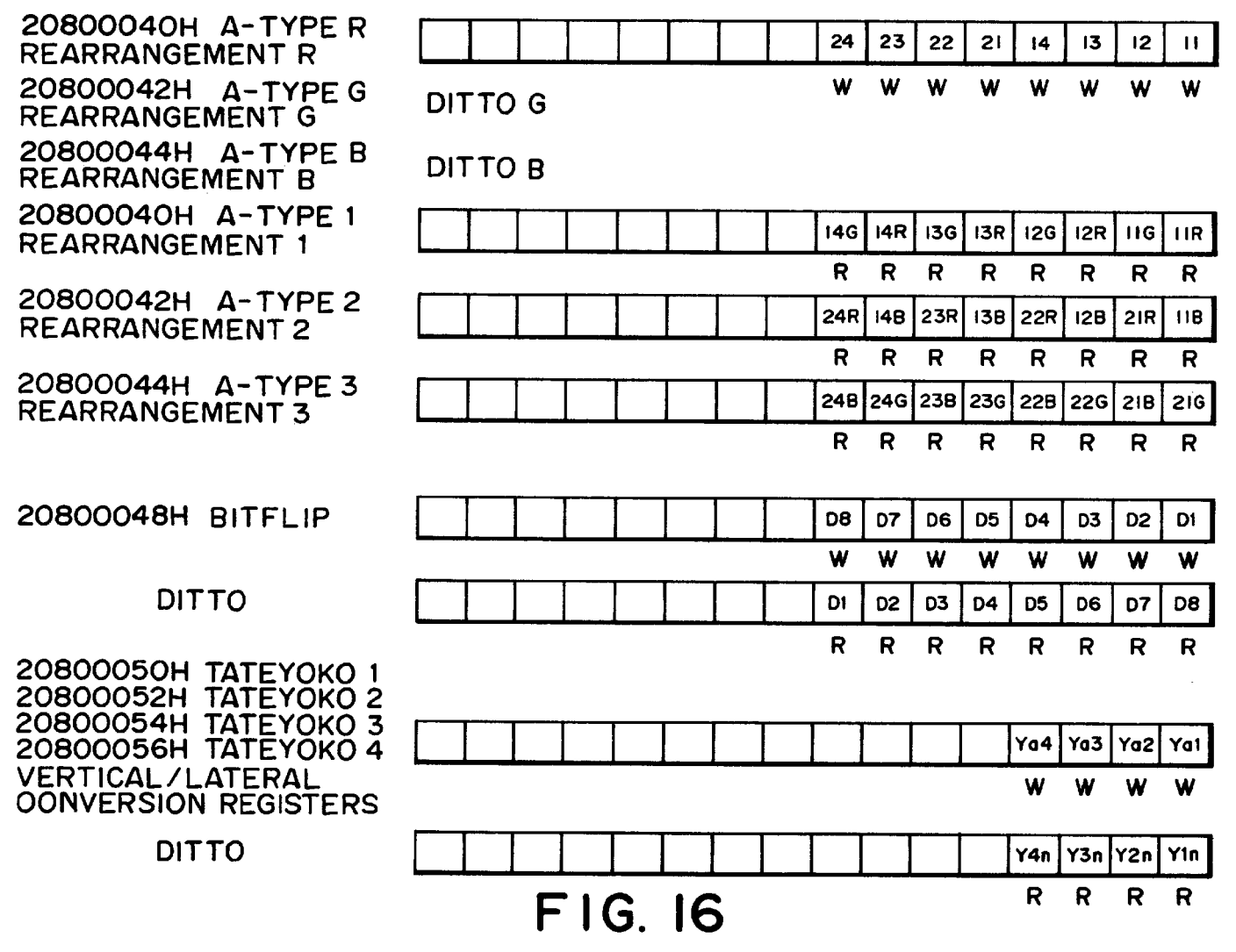

Referring to FIG. 16, the rearrangement is performed by writing data into respective registers of REARRANGEMENT R, REARRANGEMENT G and REARRANGEMENT B and reading out data from the respective registers of REARRANGEMENT 1, REARRANGEMENT 2 and REARRANGEMENT 3, respectively.

For reference, regarding the register of REARRANGEMENT R (ATYPER), for example, numbers represent a pixel position before rearrangement, including a left numeral representing a common electrode and a right-numeral representing a segment electrode.

FIG. 16 illustrates rearrangement registers for only the A-type display apparatus, but similar register are provided also for the B-type display apparatus, and the rearrangement may be performed similarly by rewriting and reading of data.

[2-3] Operation of Data Output

Figure 22:
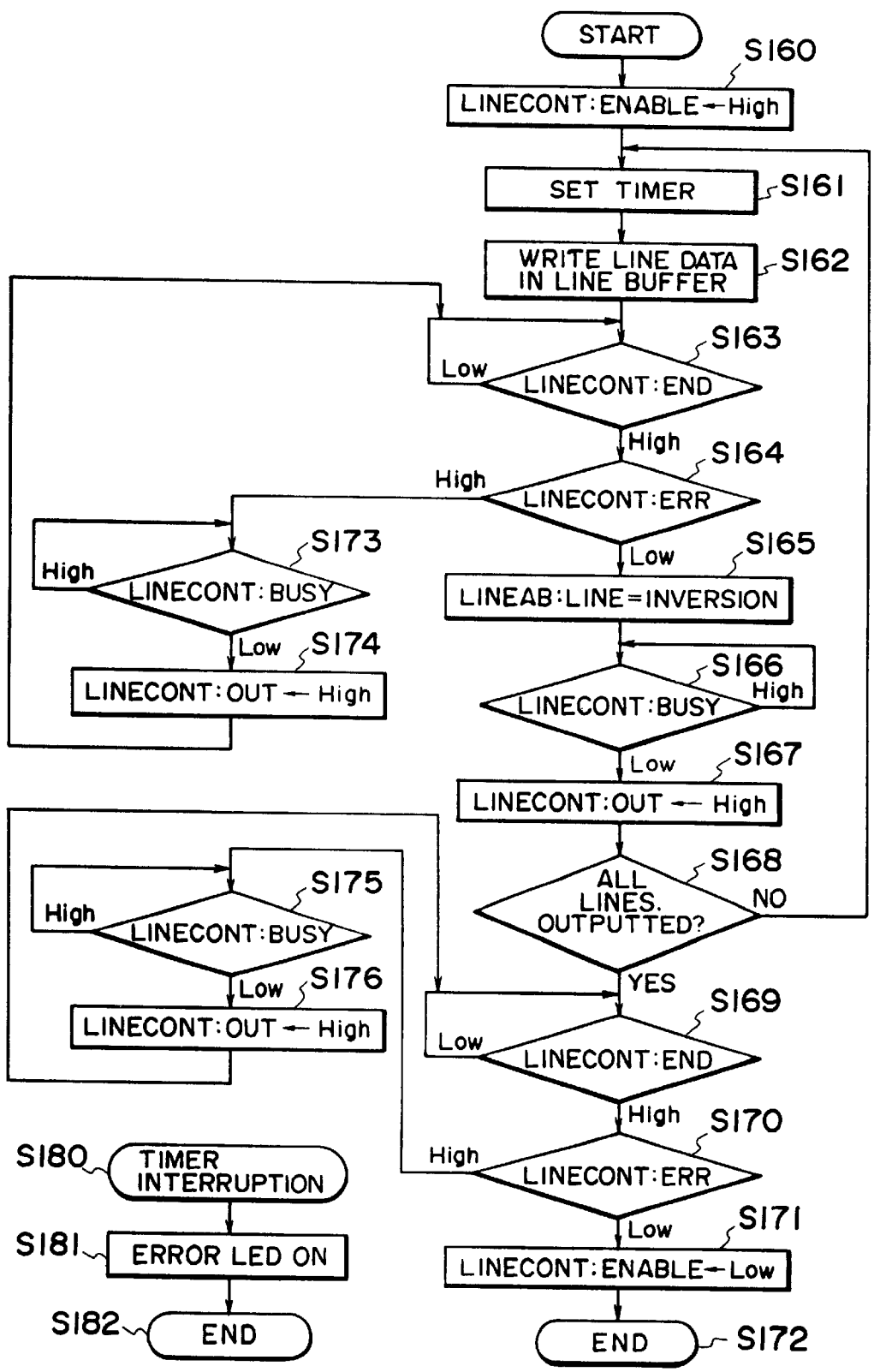
FIG. 22 is a flow chart for illustrating data output organization.

Line data output operation is described with reference to FIG. 22.

In order to output line data, ENABLE flag of LINECONT register is made ON to start a line output circuit (FIG. 22, S160) and set a timer to, e.g., 200 msec (S161), whereby line data is written into a line buffer 115 (S162).

Figure 23:
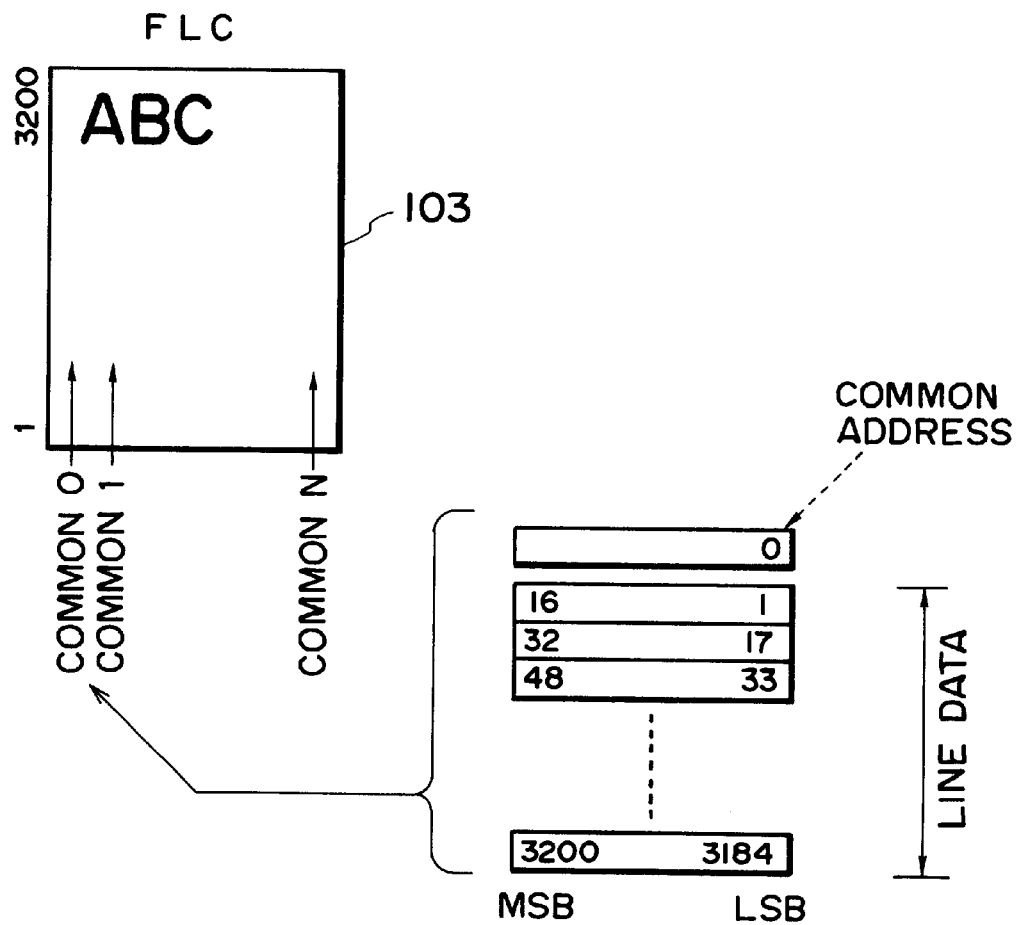
FIG. 23 illustrates an organization of output data.

When the output is completed and END flag of LINECONT register is made High (S163), ERR flag is checked, and if the flag is High (S164), Low of BUSY flag in LINECONT register is awaited (S173) and then OUT flag of the register is made High (S174). Further, in case where ERR flag is Low, LINEAB register is operated to invert the line buffer 115 up-side down (S165), and after waiting for Low of BUSY flag of LINECONT, OUT flag is made High to output line data (S166, S167). The inversion of the line buffer 115 may be performed by changing LINEAB flag from "0" to "1" or from "1" to "0" depending on the initial state is "0" or "1". Line data is outputted (transferred) at a 16 bit width by 10 MHz clock signals. Line data is converted into differential signals by a differential driver and then outputted as such differential signals. The outputted line data are provided with common address by an address counter 123 as shown in FIG. 23 and outputted together with the common address.

Then, when all line data are outputted and END flame is checked, and if the flag is High (S170), Low of BUSY flag of LINECONT register is awaited and then OUT flag of the register is made "High" (S175, S176). On the other hand, if ERR flag is Low, ENABLE flag of LINECONT register is made Low to complete the processing (S170, S171, S172).

In case where a timer interruption is caused (S170) during the operation, an error LED is turned on to complete the operation (S181, S182).

[2-4] Display on the Display Apparatus

Figure 24:
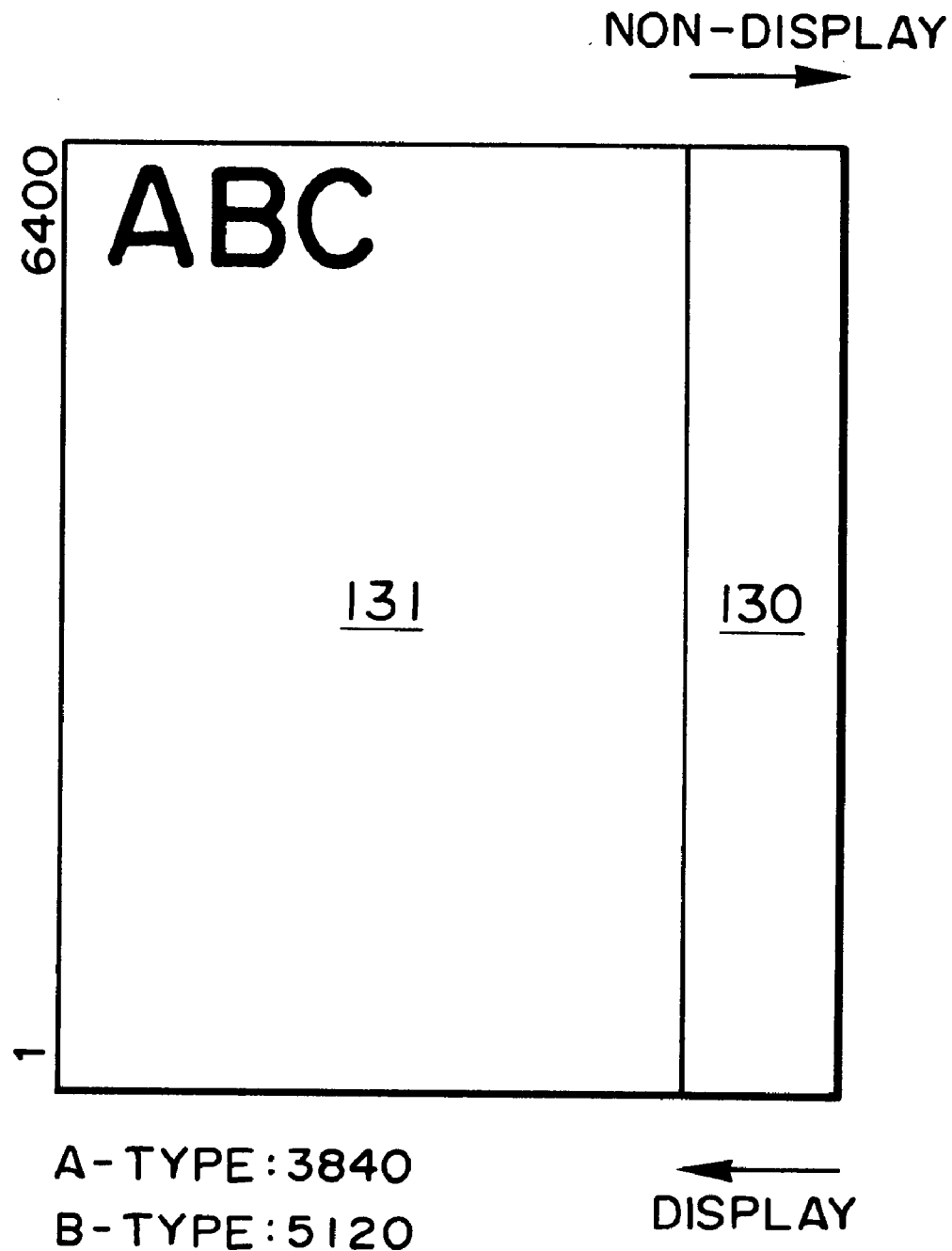
FIG. 24 illustrate an example of display state on the display apparatus 3.

FIG. 24 illustrates an example of display state on the display apparatus 103, wherein a thumbnail area is defined along a light-side region (i.e., a region 3450-th to 3839-th common lines of the type display apparatus, or a region of 4600-th to 5119-th common lines of the B-type display apparatus) in a display area.

The change from a display state to a non-display state or from a non-display state to a display state of the thumbnail area may be effected by rewriting the region while transferring line data for only the corresponding lines. In case where the thumbnail area is placed into display state, the rewriting is sequentially performed from a larger common address line (3839-th common line for A-type; or 5119-th common line for B-type) to a smaller common address line (3450-th common line for A-type; or 4600-th common line for B-type) so that the thumbnail area appears in the direction of arrow (display). On the other hand, in case where the thumbnail line is placed into a non-display state, the rewriting is sequentially performed from a smaller common address line (3450-th common line for A-type; or 4600-th common line for B-type) to a larger common address line (3839-th common line for B-type) so that the thumbnail area disappears in the direction of arrow (non-display) in FIG. 24.

Further, in case of cursor movement for local selection on the screen, line data for only the lines where a picture is rewritten accompanying the cursor movement is selectively transferred, to selectively rewrite the corresponding portion.

What is claimed is:

1. A picture display apparatus, comprising:
   data input means for inputting document data so as to allow a printer to print out print data based on the document data by connecting the printer thereto;
   picture display means, connected to said data input means, for displaying a picture;
   a conversion unit for converting the print data comprising density data into display data comprising luminance data so as to allow said picture display means to display a picture based on the display data; and
   a memory for storing luminance data for a plurality of pages converted from the density data by said conversion unit and outputting data from among the plurality of pages of luminance data according to instruction by an operator.

2. An apparatus according to claim 1, wherein said liquid crystal display panel comprises a liquid crystal showing a ferroelectric state.

3. A picture display apparatus, comprising:
   data output means for outputting picture data for a hard copy;
   picture display means for displaying a picture based on the picture data;
   conversion means, connected between said data output means and said picture display means, for converting the picture data comprising density data for a hard copy into luminance data adapted to be displayed by said picture display means; and
   a memory for storing luminance data for a plurality of pages converted from the density data by said conversion means and outputting data from among the plurality of pages of luminance data according to instruction by an operator.

4. An apparatus according to claim 3, wherein said data conversion means comprises means for re-arranging the picture data for a hard copy into an arrangement adapted for display by said picture display means.

5. An apparatus according to claim 4, wherein said picture data for a hard copy comprises color data of Y, M and C, and said data conversion means converts the color data of Y, M and C into color data of R, G and B.

6. An apparatus according to claim 7, wherein said picture display means displays a picture at a resolution of at least 200 dpi.

7. A picture display apparatus, comprising:

data output means for outputting picture data for a hard copy;

picture display means for displaying a picture based on the picture data;

a conversion unit, connected between said data output means and said picture display means, to convert the picture data comprising density data for a hard copy into luminance data adapted to be displayed by said picture display means; and a memory for storing luminance data for a plurality of pages converted from the density data by said conversion unit and outputting data from among the plurality of pages of luminance data according to instruction by an operator.

8. An apparatus according to claim 7, wherein said liquid crystal display panel is a liquid crystal panel comprising a liquid crystal exhibiting ferroelectricity.

9. An apparatus according to claim 3, wherein said data conversion means is disposed integral with said picture display means.

10. An apparatus according to claim 3, wherein said data output means comprises a personal computer.

11. An apparatus according to claim 1, wherein said display data comprises luminance data of three colors of R, G and B.

12. An apparatus according to claim 1, wherein said picture display means is set to display a picture that is substantially identical in shape and resolution to a picture printed out by the printer.

13. A picture display apparatus, comprising:

a computer for inputting document data so as to allow a printer to print out print data based on the document by connecting the printer thereto;

a display connected to said computer;

a conversion unit to convert the print data comprising density data into display data comprising luminance data so as to allow the display to display a picture based on the display data; and a memory for storing luminance data for a plurality of pages converted from the density data by said conversion unit and outputting data from among the plurality of pages of luminance data according to instruction by an operator.

14. A picture display apparatus, comprising:

a computer for outputting picture data for a hard copy;

a display for displaying a picture based on the picture data;

conversion means for converting the picture data comprising density data for a hard copy into luminance data adapted to be displayed by said display; and a memory for storing luminance data for a plurality of pages converted from the density data by said conversion means and outputting data from among the plurality of pages of luminance data according to instruction by an operator.

15. An apparatus according to claim 13, wherein said display is a liquid crystal display panel.

16. A picture display apparatus, comprising:

a computer for outputting picture data for a hard copy;

a display for displaying a picture based on the picture data;

a conversion unit to convert the picture data comprising density data for a hard copy into luminance data adapted to be displayed by said display; and a memory for storing luminance data for a plurality of pages converted from the density data by said conversion unit and outputting data from among the plurality of pages of luminance data according to instruction by an operator.

17. An apparatus according to claim 1, wherein said picture display means comprises a liquid crystal display panel.

18. An apparatus according to claim 3, wherein said picture display means displays a picture at a resolution of at least 200 dpi.

19. An apparatus according to claim 7, wherein said picture display means includes a liquid crystal display panel as a display unit.

20. An apparatus according to claim 13, wherein said display is adapted for displaying a picture at a resolution of at least 200 dpi.

21. An apparatus according to claim 14, wherein said display is adapted for displaying a picture at a resolution of at least 200 dpi.

22. An apparatus according to claim 16, wherein said display is a liquid crystal display panel.

* * * * *